(12) United States Patent
Onishi et al.

(10) Patent No.: US 8,073,188 B2
(45) Date of Patent: Dec. 6, 2011

(54) IMAGE GENERATION APPARATUS, COMPUTER READABLE MEDIUM, COMPUTER DATA SIGNAL, INFORMATION GENERATION METHOD, INFORMATION READING SYSTEM, ELECTRONIC PEN AND RECORDING MEDIUM

(75) Inventors: Takeshi Onishi, Kanagawa (JP); Takashi Sonoda, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1129 days.

(21) Appl. No.: 11/785,333

(22) Filed: Apr. 17, 2007

(65) Prior Publication Data

US 2008/0101700 A1 May 1, 2008

(30) Foreign Application Priority Data

Oct. 27, 2006 (JP) ................ P2006-291920

(51) Int. Cl.
*G06K 9/00* (2006.01)
(52) U.S. Cl. .................... 382/100; 382/181
(58) Field of Classification Search ............ 358/1.1–1.9, 358/1.11–1.18, 3.28, 3.24, 2.1, 450; 382/100, 382/181; 345/629; 713/176, 193; 283/72, 283/113, 92, 902; 399/366; 380/203
See application file for complete search history.

(56) References Cited

U.S. PATENT DOCUMENTS

| | | | |
|---|---|---|---|
| 7,339,599 B2 * | 3/2008 | Hayashi | 345/629 |
| 7,599,099 B2 * | 10/2009 | Tamaru | 358/3.28 |
| 2003/0179399 A1 | 9/2003 | Matsunoshita | |
| 2003/0179412 A1 | 9/2003 | Matsunoshita | |
| 2005/0171914 A1 | 8/2005 | Saitoh | |
| 2005/0201621 A1 | 9/2005 | Wang et al. | |
| 2007/0019245 A1 * | 1/2007 | Katsurabayashi | 358/3.28 |
| 2007/0030521 A1 * | 2/2007 | Fujii et al. | 358/3.28 |
| 2007/0199990 A1 * | 8/2007 | Sonoda | 235/454 |
| 2008/0307521 A1 * | 12/2008 | Hosoda | 726/17 |

FOREIGN PATENT DOCUMENTS

| | | |
|---|---|---|
| JP | 2003-511761 T | 3/2003 |
| JP | 2003-280469 A | 10/2003 |

(Continued)

OTHER PUBLICATIONS

English Translation of Sadao et al ,Two-Dimensional Code Pattern, Two-Dimensional Code Generating Method, Two-Dimensional Code Generator and Printing Medium, Patent Abstract of Japan, Publication No. 2006-085679, Mar. 30, 2006.*

Takashi Sonoda et al., "Image Generation Apparatus, Image Processing Apparatus, Computer Readable Medium and Computer Data Signal," Unpublished U.S. Appl. No. 11/785,330, filed Apr. 17, 2007.

(Continued)

*Primary Examiner* — Samir Ahmed
*Assistant Examiner* — Mehdi Rashidian
(74) *Attorney, Agent, or Firm* — Morgan, Lewis & Bockius LLP

(57) ABSTRACT

An image generation apparatus includes an additional image information generation section and a superposition information generation section. The additional image information generation section generates additional image information in which control information, which controls operation of a machine for reading information recorded on a recording medium, is placed as second image information in partitions formed by two-dimensionally placing position information, which are unique to positions on the recording medium or unique to recording positions of a document image recorded on the recording medium as first image information. The superposition information generation section converts acquired document information into third image information and superposes the third image information and the additional image information generated by the additional image information generation section to generate superposition information.

12 Claims, 24 Drawing Sheets

FOREIGN PATENT DOCUMENTS

| | | |
|---|---|---|
| JP | 2003-283790 A | 10/2003 |
| JP | 2004-260341 A | 9/2004 |
| JP | 2005-235185 A | 9/2005 |
| JP | 2005-259108 A | 9/2005 |
| JP | 2006-85679 A | 3/2006 |
| WO | WO 01/26032 A1 | 4/2001 |
| WO | WO 01/26033 A1 | 4/2001 |
| WO | WO 01/26034 A1 | 4/2001 |

OTHER PUBLICATIONS

Takeshi Onishi et al., "Image Generation Apparatus and Recording Medium," Unpublished U.S. Appl. No. 11/785,324, filed Apr. 17, 2007.

Takeshi Onishi et al., "Image Processing Apparatus, Computer Readable Medium, and Computer Data Signal," Unpublished U.S. Appl. No. 11/785,329, filed Apr. 17, 2007.

* cited by examiner

COMBINATIONS OF SYNCHRONOUS CODES

FIG. 4

EXAMPLE OF IDENTIFICATION CODE BLOCK

| SYNCHRONOUS CODE | X POSITION CODE | X POSITION CODE | X POSITION CODE | X POSITION CODE |
|---|---|---|---|---|
| Y POSITION CODE | IDENTIFICATION CODE | IDENTIFICATION CODE | IDENTIFICATION CODE | IDENTIFICATION CODE |
| Y POSITION CODE | IDENTIFICATION CODE | IDENTIFICATION CODE | IDENTIFICATION CODE | IDENTIFICATION CODE |
| Y POSITION CODE | IDENTIFICATION CODE | IDENTIFICATION CODE | IDENTIFICATION CODE | IDENTIFICATION CODE |
| Y POSITION CODE | IDENTIFICATION CODE | IDENTIFICATION CODE | IDENTIFICATION CODE | IDENTIFICATION CODE |

FIG. 5

EXAMPLE OF CONTROL CODE BLOCK

| SYNCHRONOUS CODE | X POSITION CODE | X POSITION CODE | X POSITION CODE | X POSITION CODE |
|---|---|---|---|---|
| Y POSITION CODE | CONTROL CODE | CONTROL CODE | CONTROL CODE | CONTROL CODE |
| Y POSITION CODE | CONTROL CODE | CONTROL CODE | CONTROL CODE | CONTROL CODE |
| Y POSITION CODE | CONTROL CODE | CONTROL CODE | CONTROL CODE | CONTROL CODE |
| Y POSITION CODE | CONTROL CODE | CONTROL CODE | CONTROL CODE | CONTROL CODE |

FIG. 6
CONFIGURATION EXAMPLES (1) OF CONTROL CODE
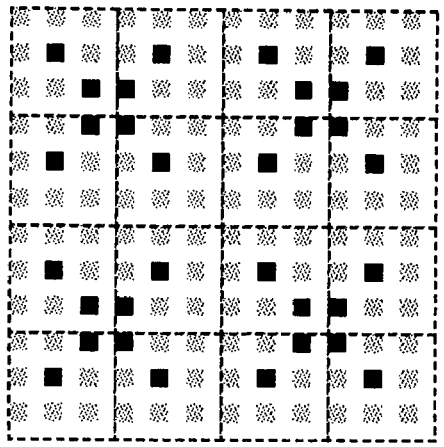
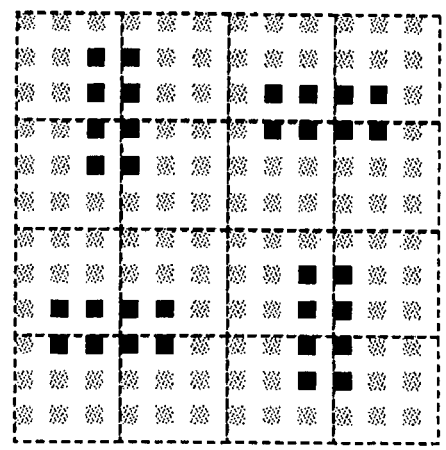
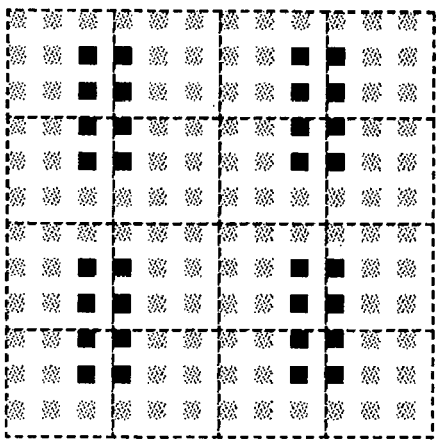
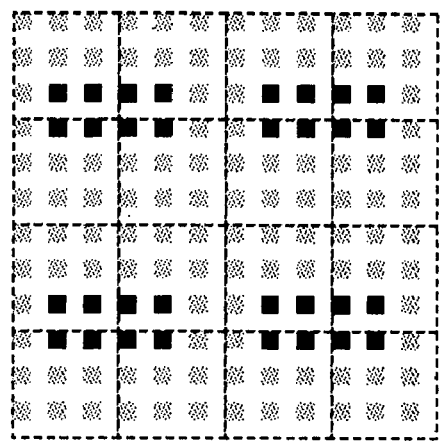
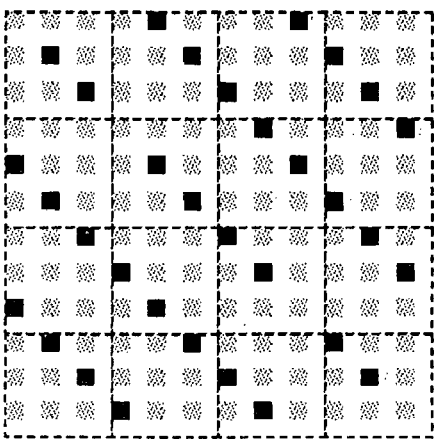
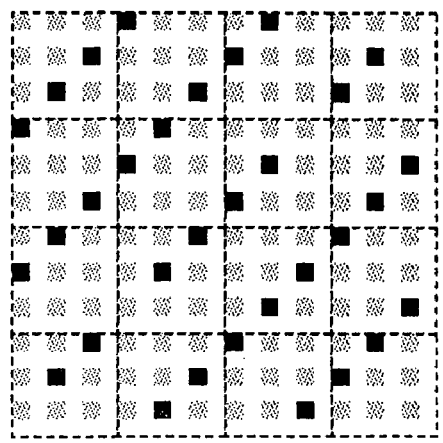

ANOTHER EXAMPLE OF CONTROL CODE BLOCK

FIG. 8
CONFIGURATION EXAMPLES (2) OF CONTROL CODE
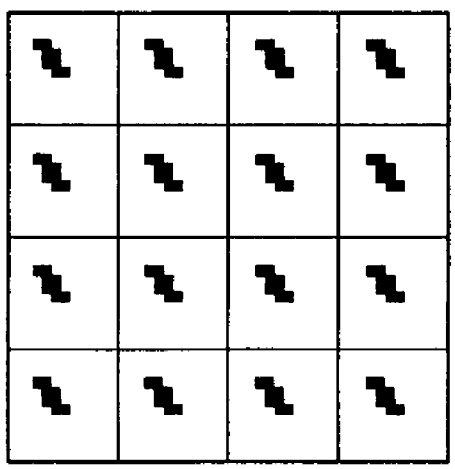
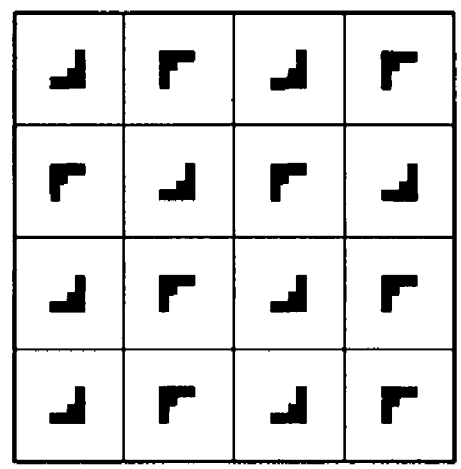
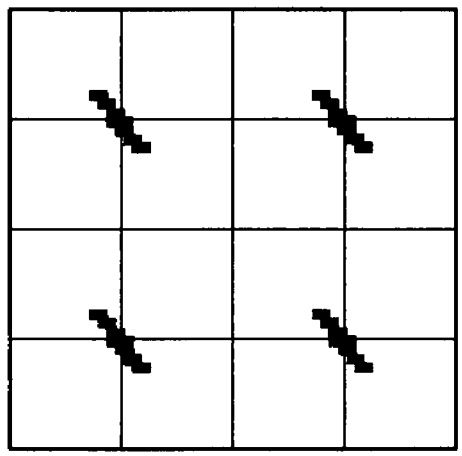
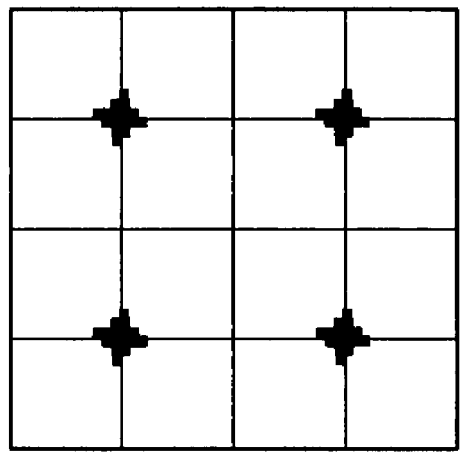

METHOD OF GENERATING CODE PATTERN IMAGE

EXAMPLE OF COMBINING CODE BLOCKS

- SYNCHRONOUS CODE
- X COORDINATE CODE
- CONTROL CODE
- IDENTIFICATION CODE
- Y COORDINATE CODE

- SYNCHRONOUS CODE
- X COORDINATE CODE
- CONTROL CODE 0
- CONTROL CODE 1
- IDENTIFICATION CODE
- Y COORDINATE CODE

METHOD OF RECORDING PRINT DOCUMENT INFORMATION

DECODING PROCESS METHOD

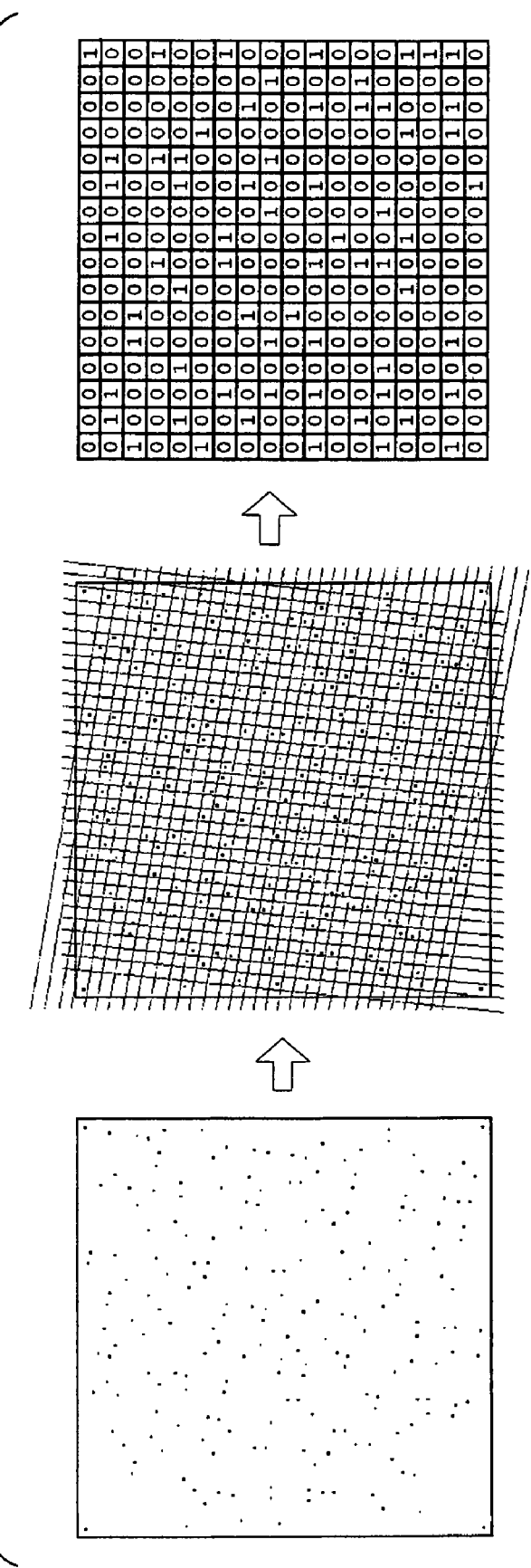

DETECTION OF BOUNDARY BETWEEN UNIT CODE PATTERNS (1)

METHOD OF DETERMINING BOUNDARY
BETWEEN UNIT CODE PATTERNS

DETECTION OF BOUNDARY BETWEEN UNIT CODE PATTERNS (2)

OPERATION CONTROL METHOD

PEN TIP

WRITING-INFORMATION GENERATION METHOD

US 8,073,188 B2

IMAGE GENERATION APPARATUS, COMPUTER READABLE MEDIUM, COMPUTER DATA SIGNAL, INFORMATION GENERATION METHOD, INFORMATION READING SYSTEM, ELECTRONIC PEN AND RECORDING MEDIUM

CROSS-REFERENCE TO RELATED APPLICATIONS

This application is based on and claims priority under 35 U.S.C. §119 from Japanese Patent Application No. 2006-291920 filed Oct. 27, 2006.

BACKGROUND

Technical Field

The invention relates to an image generation apparatus, a computer readable medium, a compute data signal, an information generation method, an information reading system, an electronic pen and a recording medium.

SUMMARY

According to an aspect of the invention, an image generation apparatus includes an additional image information generation section and a superposition information generation section. The additional image information generation section generates additional image information in which control information, which controls operation of a machine for reading information recorded on a recording medium, is placed as second image information in partitions formed by two-dimensionally placing position information, which are unique to positions on the recording medium or unique to recording positions of a document image recorded on the recording medium as first image information. The superposition information generation section converts acquired document information into third image information and superposes the third image information and the additional image information generated by the additional image information generation section to generate superposition information.

BRIEF DESCRIPTION OF THE DRAWINGS

Exemplary embodiments of the invention will be described in detail below with reference to the accompanying drawings, wherein:

FIG. 4 is a drawing to show an example of an identification code block in the exemplary embodiment of the invention shown in FIG. 1;

FIG. 5 is a drawing to show an example of a control code block in the exemplary embodiment of the invention shown in FIG. 1;

FIG. 6 is a drawing to show examples of forming a control code by combining unit code patterns in the exemplary embodiment of the invention shown in FIG. 1;

FIG. 8 is a drawing to show examples of a predetermined pattern that forms a control code rather than a combination of unit code patterns;

FIG. 17 is a drawing to describe an outline of a synchronization step executed by a synchronization section of the multifunction machine shown in FIG. 15;

DETAILED DESCRIPTION

Exemplary embodiments of the invention will be described with the accompanying drawings. First, the structure of a code pattern image used in the exemplary embodiment will be described. Then, a code pattern image generation apparatus will be described that uses the code pattern image.

(Unit Code Pattern)

Figure 1:
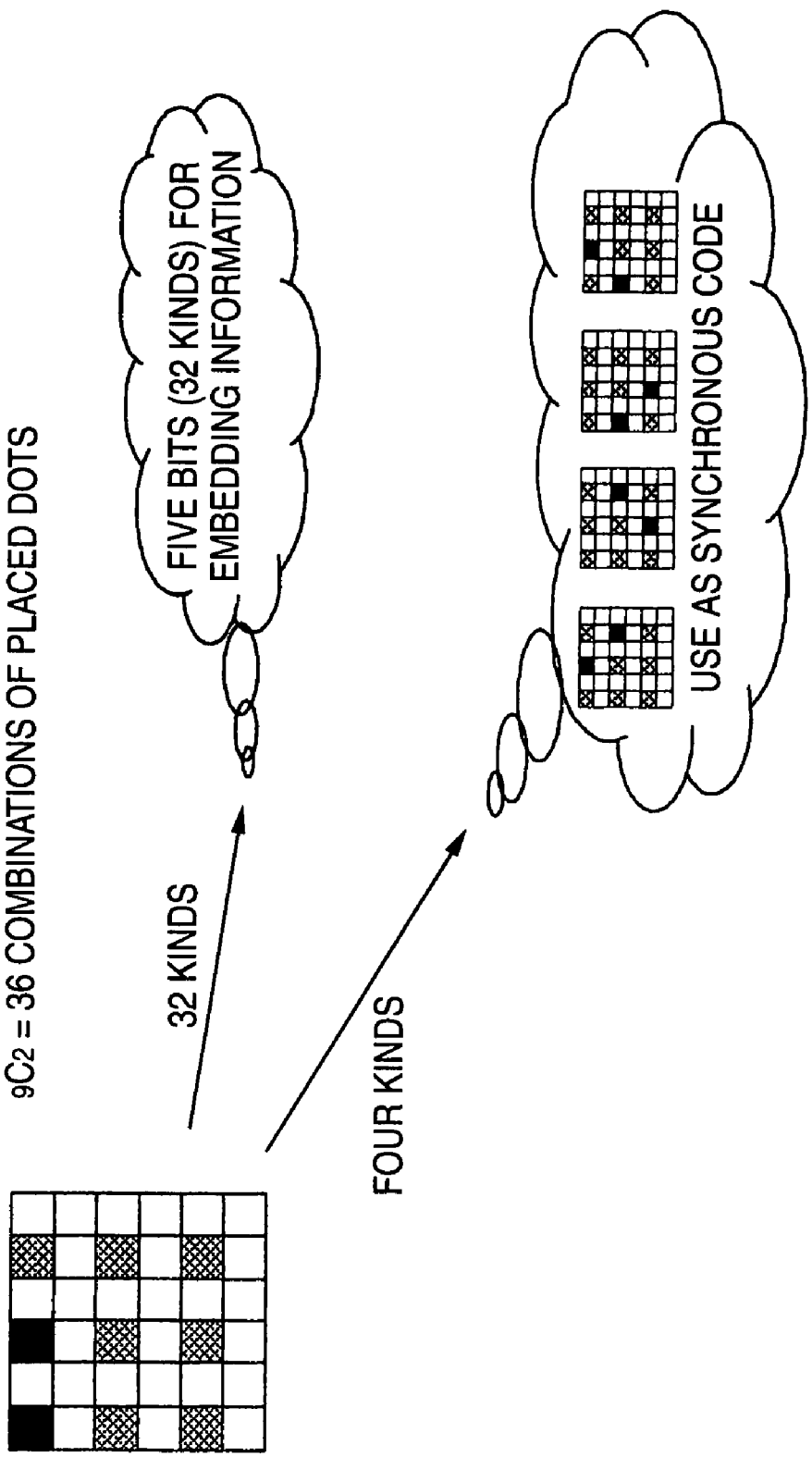
FIG. 1 is a schematic representation to show an example of a unit code pattern according to an exemplary embodiment of the invention.

FIG. 1 is a schematic representation to show an example of a unit code pattern of the code pattern image. In this example, two positions are selected from among nine-dot placeable positions having three positions in height by three positions in width (hereinafter, expressed as 3×3 points), and then dots are placed in the selected two positions. In this case, the number of combinations of dots placed in the unit code pattern are 36 ($_9C_2=36$; where $_mC_n=m!/\{(m-n)!\times n!\}$). When 600-dpi recording is executed, one dot size (size of quadrangle) in FIG. 1 is two pixels in height by two pixels in width (hereinafter, expressed as "2×2 pixels"; 84.6 μm×84.6 μm rectangle on calculation, but actual dot shape having about φ100 μm because of the effect of xerography process in recording toner image). Therefore, the size of the unit code pattern becomes 0.5076 mm×0.5076 mm.

Four of the 36 combinations are used as a synchronous code for detecting a code block (described later) and detecting the rotation angle of the code block. At this time, to detect the rotation angle of the code block in 90-degree units, the four patterns are selected so that they become patterns symmetrical with respect to 90-degree rotation. That is, if any one of the four combinations (patterns) is embedded as a synchronous code in generating an image, the rotation angle of the code block (which direction of 0, 90, 180, and 270 degrees code blocks synchronized on a two-dimensional array direct) can be determined and corrected during the decoding depending on at which angle the synchronous code is detected.

The remaining 32 (=$2^5$) of the 36 combinations can be used to embed five-bit information per unit code pattern.

Figure 2:
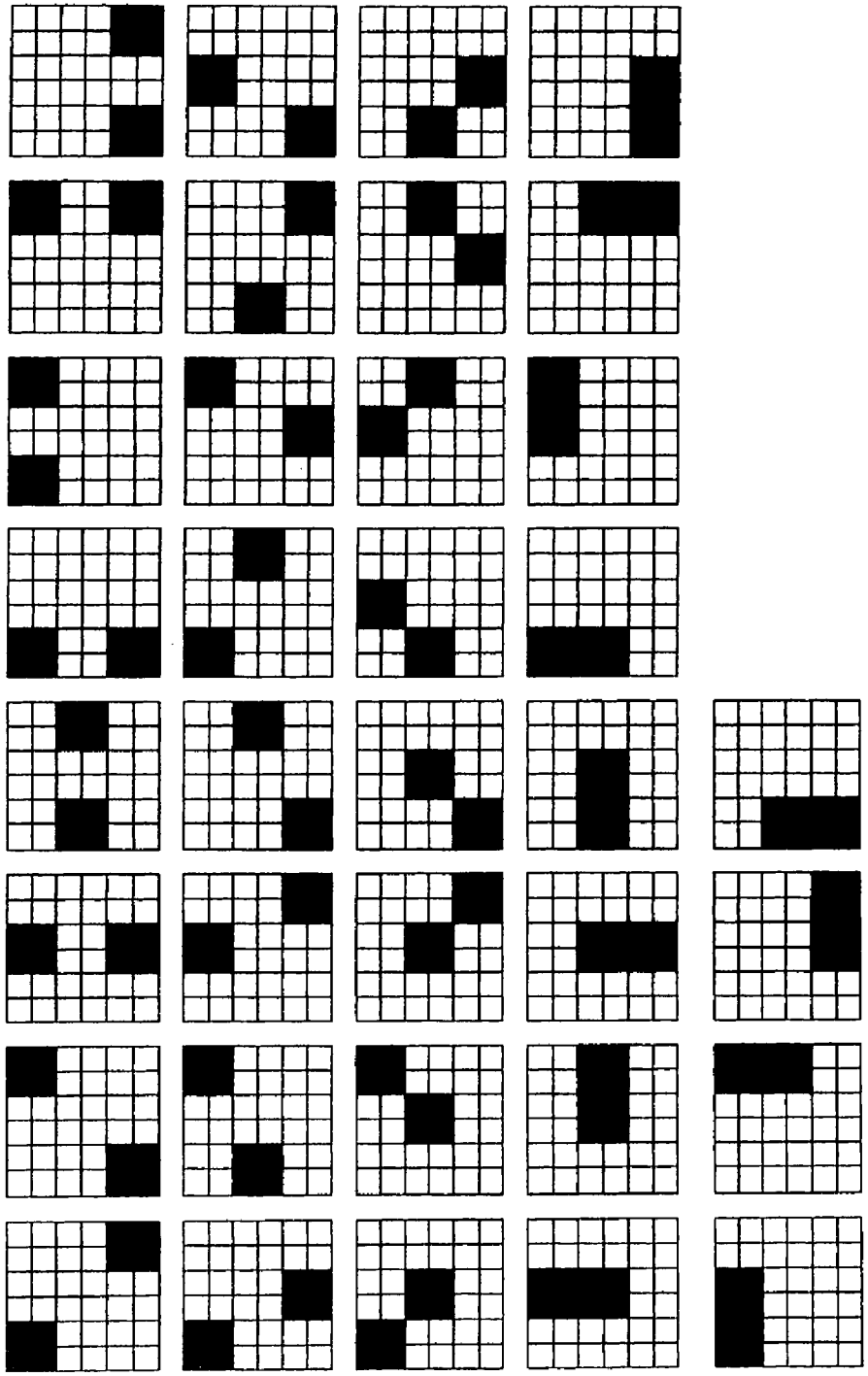
FIG. 2 is a drawing to show 36 dot placements that the unit code pattern shown in FIG. 1 can take.
Figure 3A:
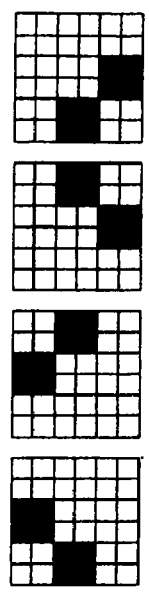
FIG. 3 is a drawing to show combinations of synchronous codes that can be selected from among the 36 dot placements that the unit code pattern shown in FIG. 1 can take.
Figure 3B:
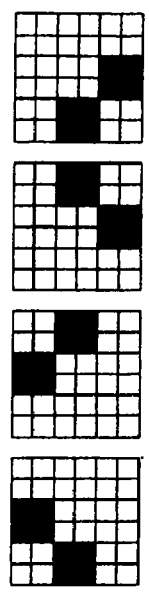
Figure 3C:
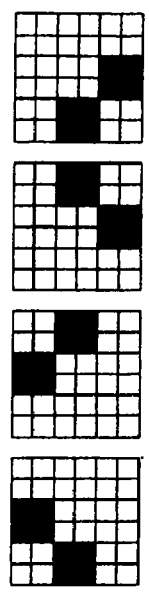
Figure 3D:
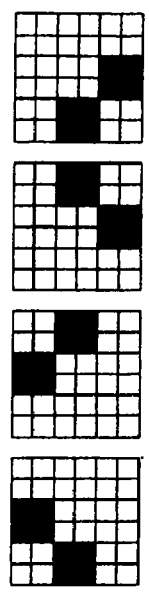
Figure 3E:
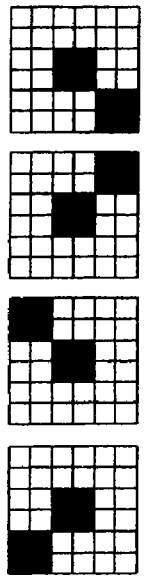
Figure 3F:
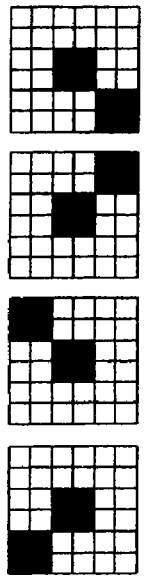
Figure 3G:
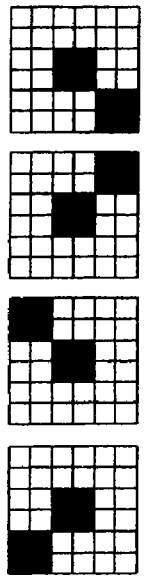
Figure 3H:
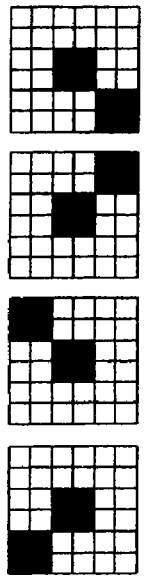

FIG. 2 shows the 36 combinations of placed dots that the unit code pattern shown in FIG. 1 can take. For simplicity of display, space between dots is omitted in FIG. 2.

The unit code pattern is not limited to the method of placing dots in two points from among nine points as shown in FIGS. 1 and 2. Alternatively, three or four may be adopted, namely, any value smaller than nine may be adopted. For example, to place dots in three positions among nine positions, the number of combinations of placed dots are 84 ($_9C_3$=84). Also, the number of dot placeable positions is not limited to nine (three×three), and may be any other number, such as four (two×two) or 16 (four×four), for example.

(Combination of Synchronous Codes)

FIG. 3 shows combinations of synchronous codes that can be selected from among the 36 combinations of placed dots that the unit code pattern in FIG. 1 can take. The combinations shown in FIG. 3 are symmetrical with respect to 90-degree rotation. Any combination may be used as four code patterns for synchronous code.

(Code Block for Embedding Identification Code)

FIG. 4 shows an example of a code block for embedding an identification code (identification code block) as an example of identification information generated by an identification code generation section 22 (described later). The unit code patterns shown in FIG. 1 are arranged as 5×5 to form the code block.

The synchronous code shown in FIG. 3 is placed in the upper left corner of the code block. That is, any is selected from among the synchronous codes in FIGS. 3A to 3H, and one selected from among the four unit code patterns contained in the selected synchronous code is placed in the upper left corner of the code block.

(Position Code)

Position codes will be described as an example of position information generated by a position code generation section 20 (described later). Four unit code patters to the right of the synchronous code are used to place an X position code that is coding information unique to a position in the X direction. Four unit code patters below the synchronous code are used to place a Y position code that is coding information unique to a position in the Y direction. Each of the X position code and the Y position code uses four unit code patters, and thus can store 20-bit information (=five bits×four). The X position code and the Y position code according to the exemplary embodiment are an example of position information.

The 32 (=$2^5$) kinds of patterns for embedding information may not be used as the position codes, but only 16 kinds of patterns may be used. In this case, the information amount per unit code pattern is four bits (16=$2^4$) and therefore, 16-bit information amount (four bits×four) results as a position code.

An M sequence may be used as an example of position codes. For example, if a 12-order M sequence is used, the sequence length of the M sequence is 4094 (=$2^{12}$−1). If 16 kinds of patterns are selected as the unit code patterns of position code, four-bit information can be stored in each unit code pattern. In this case, thus, 16-bit information (four bits×four) can be stored. Therefore, the M sequence having the sequence length 4095 may be divided into 255 (=4095÷16) code blocks to store. Since the size of one code block is 2.538 mm×2.538 mm (=0.5076 mm×0.5076 mm/unit code pattern× 5), the length of the 255 consecutive code blocks becomes 647.19 mm. Thus, the length of 647.19 mm can be encoded. That is, encoding can be executed up to A2-size (420 mm×594 mm) paper.

Although one M sequence is used to encode positions by way of example, plural M sequence may be concatenated to further increase the number of the positions that can be encoded. For example, even in the case of using 11-order M sequence, four 11-order M sequences may be concatenated to encode A0-size paper.

(Identification Code)

An identification code is placed in the remaining area of the code block. Since 16 unit code patterns (four×four) can be placed in the area, 80-bit information (five bits/unit code pattern×16) can be stored. Since the unit code pattern in the exemplary embodiment is a multilevel code, an error may occur in reading in units of the unit code patterns. Therefore, an error correction code may be a method that can make an error correction in units of blocks. If RS code that is a known block error correction code is used for the identification code, the block length of the RS code can be set to five bits which are the information amount of the unit code pattern. In this case, the code length of the RS code is 16 blocks (=80 bits÷5 bits/block). For example, if a two-block correction capability is provided, the length of the information code is 12 blocks (=16 blocks−two blocks×2). In this case, 60-bit information (=five bits/block×12 blocks) can be embedded as identification information.

(Code Block for Embedding Control Code)

FIG. 5 shows an example of a code block for embedding a control code (control code block) as an example of control information generated by a control code generation section 21 (described later). A synchronous code, an X position code, and a Y position code are placed in a similar manner to that in FIG. 4. The control code is placed in the area where an identification code is placed in FIG. 4 instead of the identification code. In the example, as the control code, the 32 kinds of unit code patterns, which are obtained by excluding the four unit code patterns used as a synchronous code from the 36 unit code patterns shown in FIG. 2 and used for embedding information, are used in combination.

As the control code, control information may be encoded using an error correction code as with embedding of the identification code shown in FIG. 4. However, when the control code is used by incorporating the control code in a copier, high-speed processing is required to control the operation of the copier (for example, to stop copy, scan, facsimile transmission, etc.). Thus, configuration that can detect the control code by simple processing such as pattern matching is desirable. In this case, it is not necessary to embed digital information in the control code. It is required to determine whether the control code is present or absent or determine a kind of the control code. Thus, the unit code patterns may be combined to form a pattern. FIG. 6 shows several examples of the control code.

Since X position code and Y position code are also placed in the control code block, if the code pattern plane is scanned by a reader such as a pen scanner after the code patterns are printed on a sheet of paper, a locus of the reader (handwriting if a pen scanner is used) can be acquired from the embedded X and Y position codes.

In the example shown in FIG. 5, the unit code patterns are combined to form a control code. Therefore, the boundary between the code blocks that is used to acquire plural unit code patterns forming the code block can be easily determined. This is because the same process can be used to determine the boundary between the blocks regardless of presence of the control code, when the code block is detected from a printed image. This topic is described later as detection of boundary between unit code patterns (1) with reference to FIG. 18.

FIG. 6 shows an example of forming a control code by combining the unit code patterns. In this example, a control code provided by combining the unit code patterns is placed in a control code area corresponding to 16 unit code patterns. To speed up processing, The control code may have a shape that can be detected by simple processing. In FIG. 6, the control code does not have a significant meaning because digital information is not embedded. That is, the unit code patterns are combined to form a simple shape so that the resultant control code can be detected by simple pattern matching processing. Consequently, complicated processing of detecting the angle of the code pattern, synchronizing with a two-dimensional array as bit value, etc., becomes unnecessary.

(Another Example of Code Block for Embedding Control Code)

Figure 7:
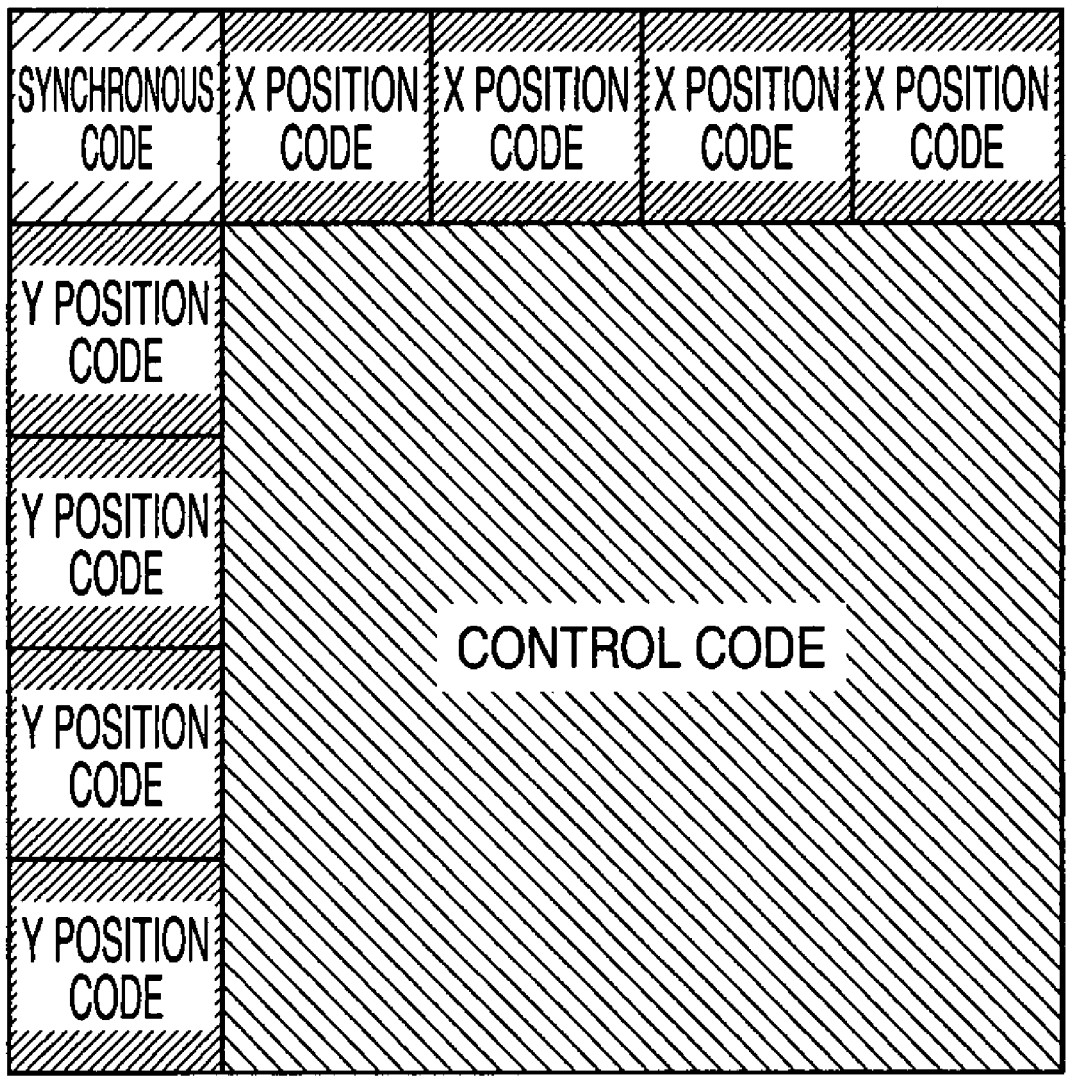
FIG. 7 is a drawing to show another example of a control code block in the exemplary embodiment of the invention shown in FIG. 1.

FIG. 7 shows another example of a control code block. The example shown in FIG. 7 is different from the example shown in FIG. 5 in that a predetermined pattern of a control code is placed using the 16-unit code patterns (four×four) rather than a combination of the unit code patterns. At this time, the density of the control code pattern is made equal to the density of the unit code patterns so that the control code pattern is made inconspicuous. Specifically, the number of the unit code patterns that can be stored in the control code area is 16 (four×four). Thus, 32 dot patterns (128 pixels because each dot pattern is two×two pixels in 600 dpi) can be placed in total. If the control code is formed so as to become an equal area to that of 32 dot patterns in total, the density of the control code pattern becomes equal to the density of the peripheral code patterns, and the control code pattern becomes inconspicuous.

In contrast, if the control code pattern and the dot patterns used in the unit code patterns are different in detectable feature amount such as an area or a color material, the feature amount may be used at the preceding stage of synchronization processing to remove only the control code pattern. Then, synchronization processing may be performed with the remaining patterns. This topic will be described as noise removal that uses filtering and infrared absorption degree and is based on the area and the shape in another example of detection of boundary between unit code patterns (2) with reference to FIG. 20.

FIG. 8 shows four examples of a predetermined pattern forming a control code rather than a combination of the unit code patterns, created according to the described method. In every example, the density of the control code (the number of dots) is made almost equal to the peripheral density to prevent a sense of incompatibility to look at, at the printing time. A control code pattern having a free shape independent of the combinations of the unit code-patterns is selected, and the control code has a pattern more easily detected by a multi-function machine. It can be determined that the pattern is not a code pattern from the area because a dot larger than $_9C_2$ is formed.

(Code Pattern Image Generation Apparatus)

Figure 9:
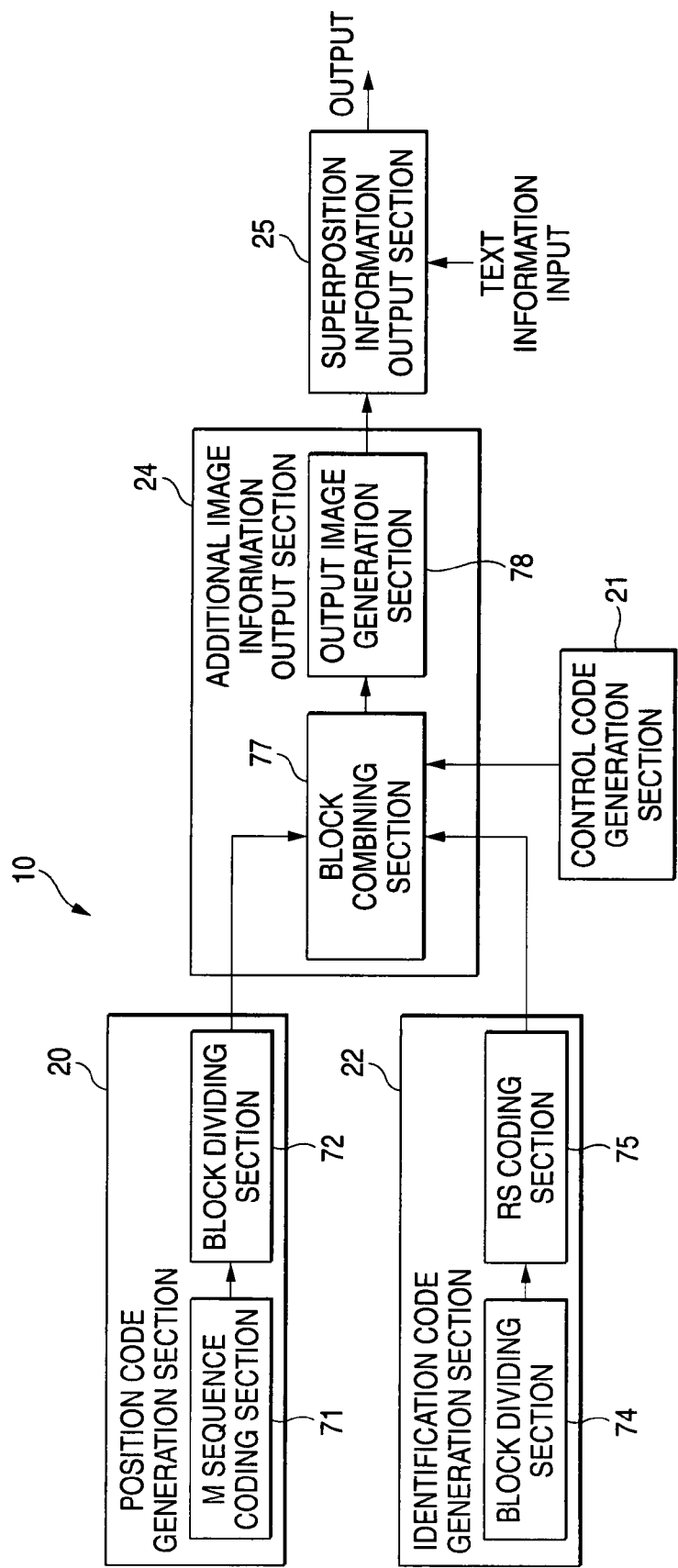
FIG. 9 is a functional block diagram to describe a code pattern image generation apparatus.

A code pattern image generation apparatus for generating the described code pattern image will be described below. FIG. 9 is a functional block diagram to describe a code pattern image generation apparatus 10 as an example of applying an information generation apparatus according to the exemplary embodiment of the invention to an identification information management server 4 (described later). The code pattern image generation apparatus 10 according to the exemplary embodiment of the invention includes the above-mentioned position code generation section 20 for generating position codes that are unique to respective recording positions on a recording medium such as a sheet of paper or recording positions of respective document images recorded on the recording medium, and the above-mentioned control code generation section 21 for generating a control code that controls the operation of a machine, which reads information recorded on the recording medium. The code pattern image generation apparatus 10 also includes the above-mentioned identification code generation section 22 for generating an identification code that identifies document information recorded on the recording medium, an additional image information output section 24 for converting position information, control information, and identification information into first to third image information and outputting the first to third image information as additional image information, and a superposition information output section 25 for converting the input document information into fourth image information, superposing the additional image information and the fourth image information, and outputting the resultant superposition information.

The position code generation section 20 includes an M sequence coding section 71 for converting the position information into an M sequence and encoding the M sequence, and a block dividing section 72 for dividing the encoded M sequence into code blocks having a predetermined size. The M sequence coding section 71 encodes the position information using the M sequence. The required M sequence order is found from a length of the position information to be encoded and is dynamically generated, to thereby encode the position information. If the length of the position information to be coded is predetermined, an M sequence is previously stored in a memory of the pattern image generation apparatus 10. In this case, when an image is generated, the M sequence is read. The block dividing section 72 divides the encoded M sequence into code blocks according to the amount of information that can be stored in one code block for storage of the M sequence. For example, in the case of using a 12-order M sequence, the sequence length of the M sequence is 4095 ($=2^{12}-1$) as previously described with reference to FIG. 4. When 16 kinds of patterns are selected as the unit code patterns of the position code and four-bit information is stored in each of the unit code patterns, one code block contains four unit code patterns as the position code. Thus, 16-bit information (four×four) can be stored. Therefore, the block dividing section 72 divides the M sequence of the sequence length 4095 into 255 code blocks ($=4095 \div 16$) and stores the 255 code blocks.

The control code generation section 21 generates a control code that controls the operation of a machine, which reads information recorded on a sheet of paper.

The identification code generation section 22 includes a block dividing section 74 for dividing the identification information into plural blocks, and an RS coding section 75 for performing a RS coding process for the provided blocks and adding a redundant block for error correction. The block dividing section 74 divides the identification information into plural five-bit blocks. For example, in the case of embedding 60-bit information, 60 bits are divided into 12 five-bit blocks as previously described with reference to FIG. 4. The RS coding section 75 performs the RS coding process for the provided blocks and adds the redundant block for error correction. If the RS code is an RS code that can correct an error in two blocks, the code length becomes 16 blocks.

The additional image information output section 24 includes a block combining section 77 for generating a (virtual) two-dimensional plane using the identification code, the position code, and the control code, and an output image generation section 78 for generating a code pattern image. The block combining section 77 places the identification code, the position code, and the control code on the two-dimensional plane to generate a two-dimensional code plane. The output image generation section 78 refers to the code plane, selects the code pattern corresponding to each code value, and generates a code pattern image as additional image information. Specifically, the output image generation section 78 replaces what are handled using internal codes called "code values" for the purpose of simplifying the internal process, such as the identification code and the control code, by code patterns (image information) corresponding to the code values, so as to generate the code pattern image.

The superposition information output section 25 converts externally input document information into the fourth image information, superposes the code pattern image and the fourth image information, and outputs the resultant superposition information. The superposition information is information described in a print description language (PDL). The document information is input from a document management server 3 (described later).

The additional image information output section 24 may form the control code and the identification code with different color materials. This is because a machine that reads information recorded on the sheet of paper can remove the control code using difference in a feature amount at the preceding stage of synchronization processing and because the calculation load of the synchronization process can be lightened. The infrared absorption amount of the color material used for the second image information of the control code may be half or less as compared with that of the color material used for the first image information of the position code. With this configuration, the control code can be removed using difference in the infrared absorption amount.

The control code may be placed only in the secret portion of a document. Duplication and copy of the secret portion can be limited based on the control code.

For example, the code pattern image generation apparatus 10 may serve as an information generation apparatus. The additional image information output section 24 may serve as an additional image information generation section. The superposition information output section 25 may serve as a superposition information generation section.

(Method of Generating Code Pattern Image)

Figure 10:
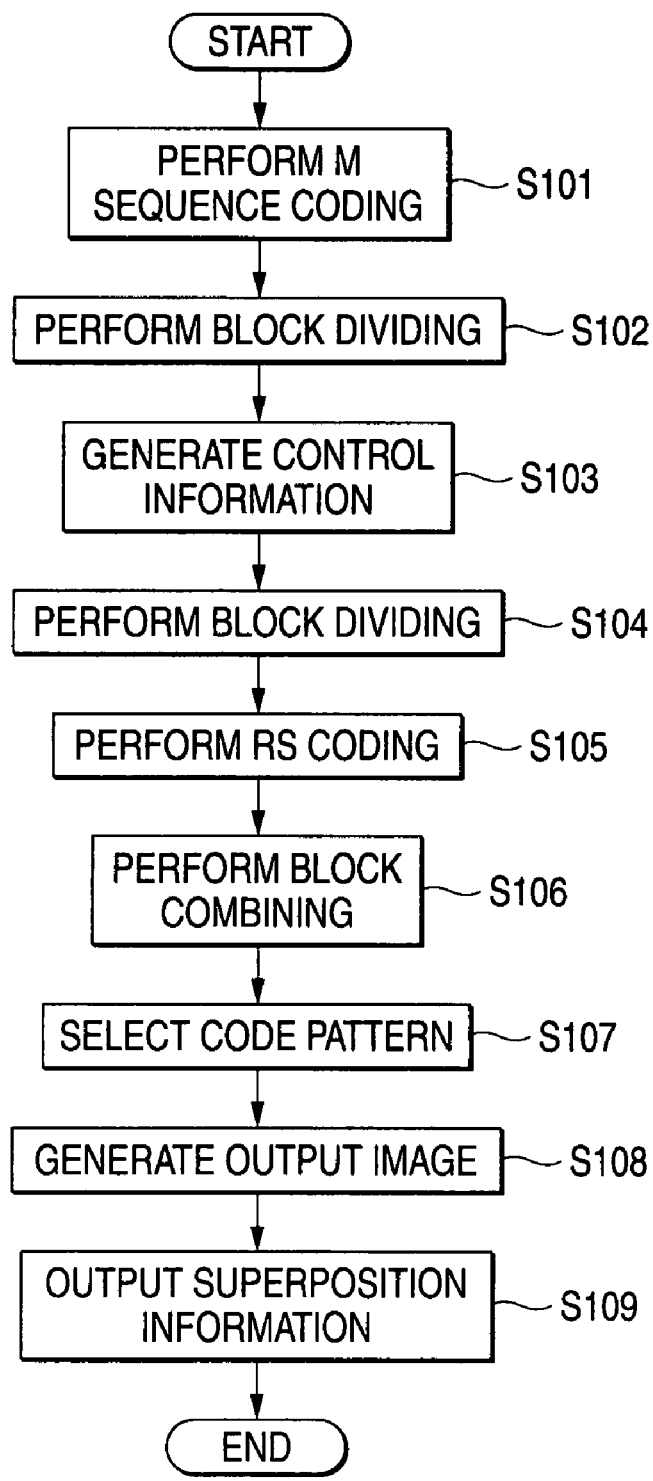
FIG. 10 is a flowchart of a method of generating a code pattern image executed by the code pattern image generation apparatus shown in FIG. 9.

A method of generating a code pattern image executed by the code pattern image generation apparatus 10 will be described by taking a code pattern image based on $_9C_2$ as an example. FIG. 10 is a flowchart of the method of generating a code pattern image.

The M sequence coding section 71 performs M-sequence encoding for position information which are unique to respective recording positions on a recording medium, and outputs the M sequence as position code (M sequence encoding step) (step 101).

The block dividing section 72 divides the output position code into code blocks (block dividing step) (step 102).

Upon reception of an external command, the control code generation section 21 generates a control code that controls the operation of a machine, which reads information recorded on a sheet of paper (control information generation step) (step 103).

The block dividing section 74 divides identification information into plural five-bit blocks (block dividing step) (step 104).

The RS coding section 75 performs the RS coding process for the provided blocks and adds a redundant block thereto (RS encoding step) (step 105).

The block combining section 77 uses the position code, the control code, and the identification code to generate a two-dimensional code plane (block combining step) (step 106).

The output image generation section 78 refers to the code plane and selects a code pattern corresponding to each code value (code pattern selection step) (step 107), and generates and outputs a code pattern image (output image generation step) (step 108).

The superposition information output section 25 converts input document information into fourth image information, superposes the code pattern image and the fourth image information, and outputs the resultant superposition information (superposition information output step) (step 109).

In the code pattern image generation apparatus 10 according to the exemplary embodiment, the position code generation section 20 acquires the position codes which are unique to the positions on the sheet of paper or the recording positions of a document image recorded on the sheet of paper. The control code generation section 21 acquires the control code that controls the operation of a machine, which reads information recorded on the sheet of paper. The additional image information output section 24 generates and outputs a code pattern image where control code is placed as second image information in partitions of the code block formed by two-dimensionally placing position codes as first image information. The superposition information output section 25 converts externally input document information into fourth image information, superposes the code pattern image and the fourth image information, and outputs the resultant superposition information. Therefore, the operation of the components of the machine, which reads the information recorded on the sheet of paper can be controlled according to the control code contained in the output superposition information.

In the code pattern image generation apparatus 10 according to the exemplary embodiment, the identification code generation section 22 generates an identification code that identifies the sheet of paper or the document information recorded on the sheet of paper. The additional image information output section 24 places the identification code and the control code in the partitions of the code block as third and second image information so as to generate a code pattern image, and outputs the code pattern image. Accordingly, the superposition information output by the superposition information output section 25 contains the identification code and the control code. Thus, the sheet of paper or the document information identified by the identification code is protected by the control code.

Further, in the code pattern image generation apparatus 10 according to the exemplary embodiment, the additional image information output section 24 places the control code and the identification code alternately in the partition of code block. Thus, the control codes and the identification codes are not unevenly distributed on the sheet of paper, so that the control code and the identification code can be acquired regardless of the reading portion of the sheet of paper.

The sheet of paper according to the exemplary embodiment contains the position code unique to the positions on the sheet of paper and the control code that controls the operation of a machine, which reads the information recorded on the sheet of paper. The control code is placed as second image information in the partitions of the code block formed by two-dimensionally placing the position codes as first image information. Therefore, in the case of using the sheet of paper on which the control code is previously recorded, the operation of a machine, which reads the information recorded on the sheet of paper, would be able to be controlled.

In the sheet of paper according to the exemplary embodiment, the identification code, which identifies the sheet of paper, is placed together with the control code as third image information in the partition of the code block formed by two-dimensionally placing the position codes as the first image information. Therefore, if information is recorded on the sheet of paper on which the control code and the identification code are previously recorded, the output information can be protected by the control code recorded on the sheet of paper.

In the sheet of paper according to the exemplary embodiment, the control code and the identification code are placed alternately in the partitions of the code block. Thus, it is difficult to remove the control codes and the identification codes from the sheet of paper on which the control codes and the identification codes are recorded without being unevenly distributed, so that the information recorded on the sheet of paper can be protected.

(Example of Combining Code Blocks)

Figure 11A:
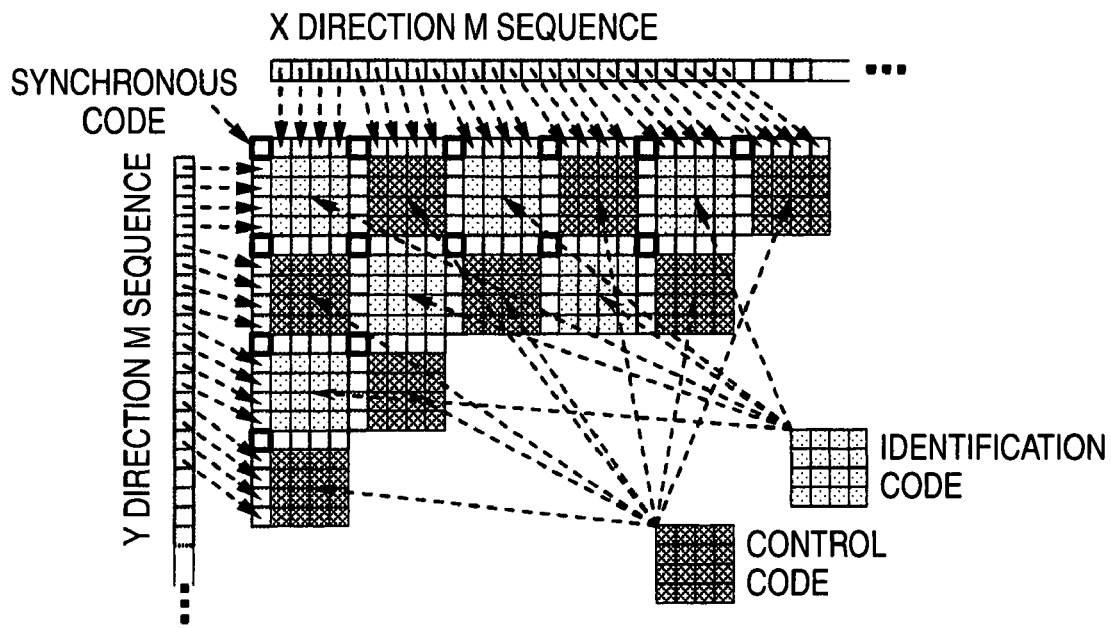
FIG. 11 is a drawing to describe a method of combining code blocks.
Figure 11B:
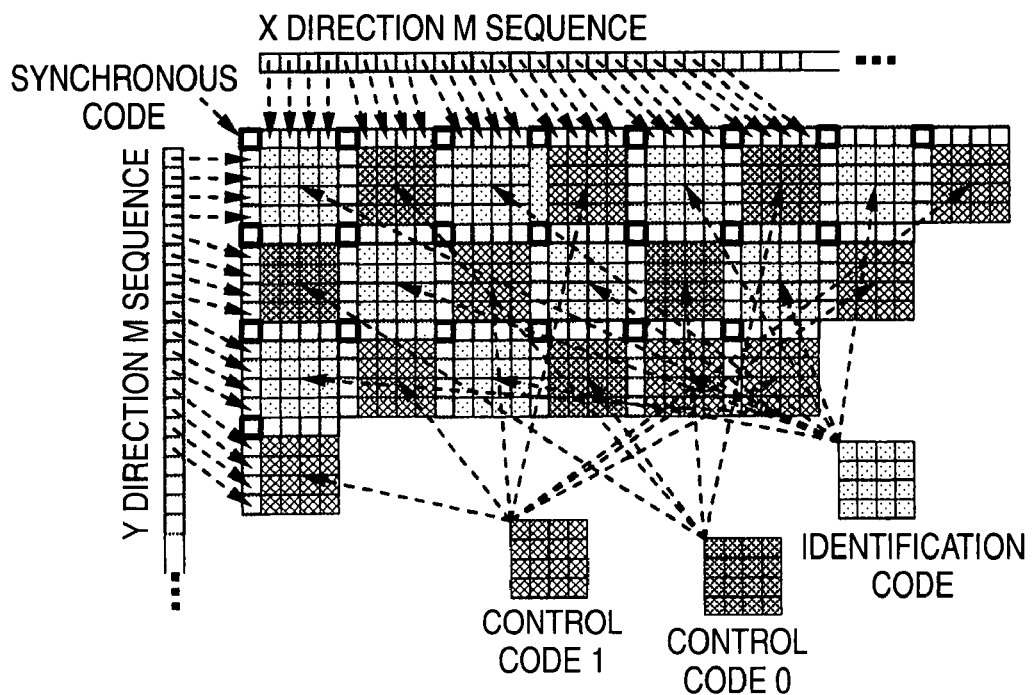

Combining of code blocks executed by the block combining section 77 at the block combining step (step 106) will be described with reference to FIG. 11. FIG. 11 is a drawing to describe a method of combining code blocks. FIG. 11A shows an example where one kind of control code is used. FIG. 11B shows another example where two kinds of control codes are used.

Position codes are placed in columns above and below and to the left and right of synchronous code. Identification codes and control codes are placed alternately in the right lower quadrants of the synchronous codes. That is, rows and columns of the position codes form a lattice, and a synchronous code is placed at each intersection point in the lattice. Identification codes and control codes are placed alternately in cells of the lattice. The position codes are position information encoded in M sequence and the identification code is identification information encoded in RS code, for example. The control code is a code pattern as previously described with reference to FIGS. 6 and 8. Since each code block contains the synchronous code, the position codes are not placed consecutively and the synchronous code is placed every four unit code patterns of the position code. In the case of using two kinds of control codes, the number of the kinds of control code patterns that, for example, mean "copy prohibited," "authenticated copy," and "only scan permitted," may be increased.

FIG. 11 shows the structure example where identification codes and control codes are placed in cells of the lattice formed by the synchronous codes and the position codes, but the invention is not limited thereto. For example, only control information may be placed in cells of the lattice (not shown).

Figure 12A:
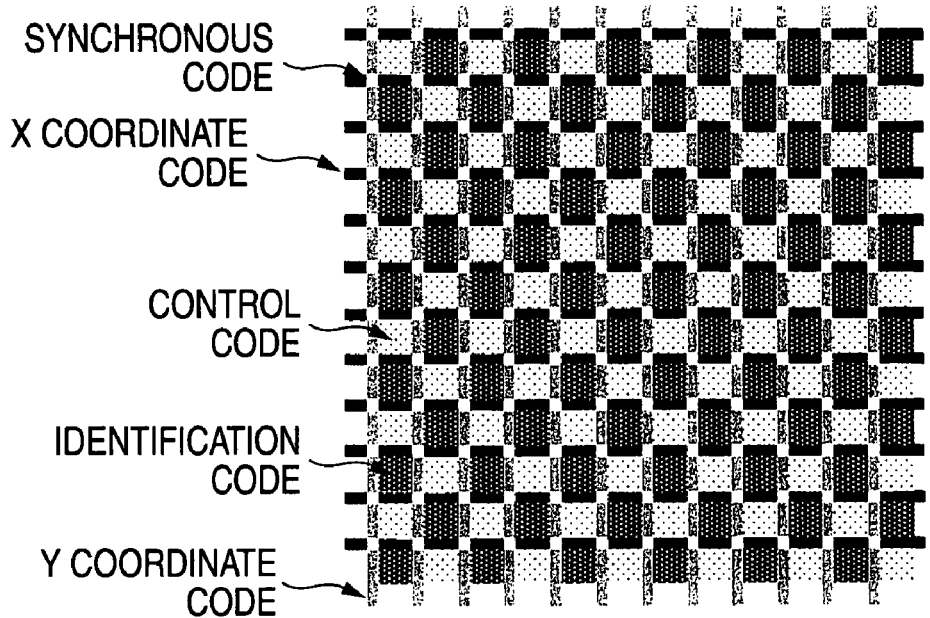
FIG. 12 is a drawing to show examples of forming control codes by combining unit code patterns.
Figure 12B:
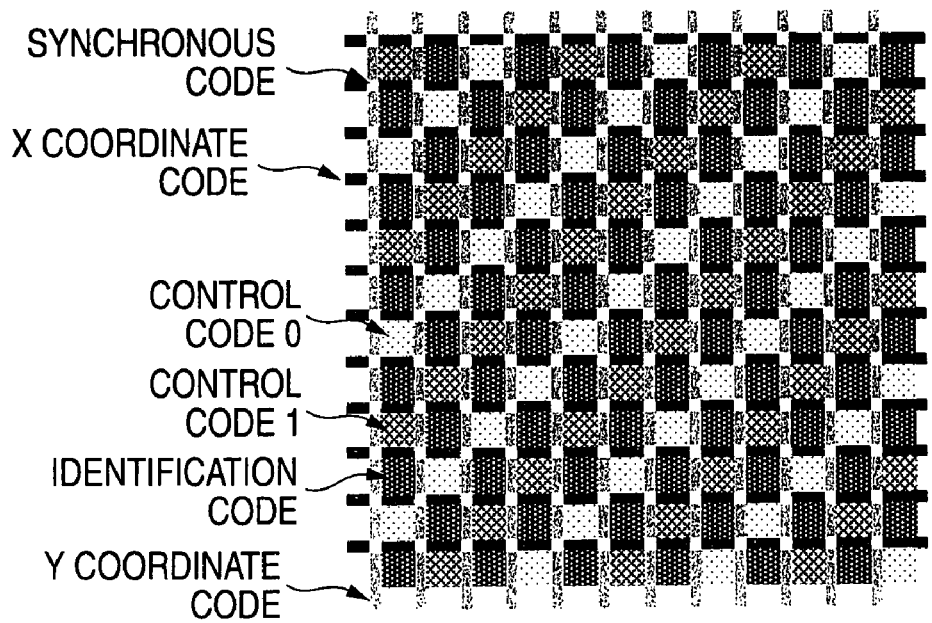

FIG. 12 shows placement examples of code patterns generated as the code blocks are thus combined. FIG. 12 shows placement examples of code patterns generated by the combining method shown in FIG. 11. FIG. 12A corresponds to FIG. 11A wherein the number of kinds of control code patterns is one. FIG. 12B corresponds to FIG. 11B wherein the number of kinds of control code patterns is two.

In both examples, since the control code patterns are placed fully on the code patterns, if the code patterns and a document image are combined and output, for example, it is substantially impossible to separate secret information described on the document and the control code patterns. A malicious user cannot separate the control pattern image therefrom, to copy or scan the secret document in an unauthorized manner.

(Print Document Information Recording System)

Figure 13:
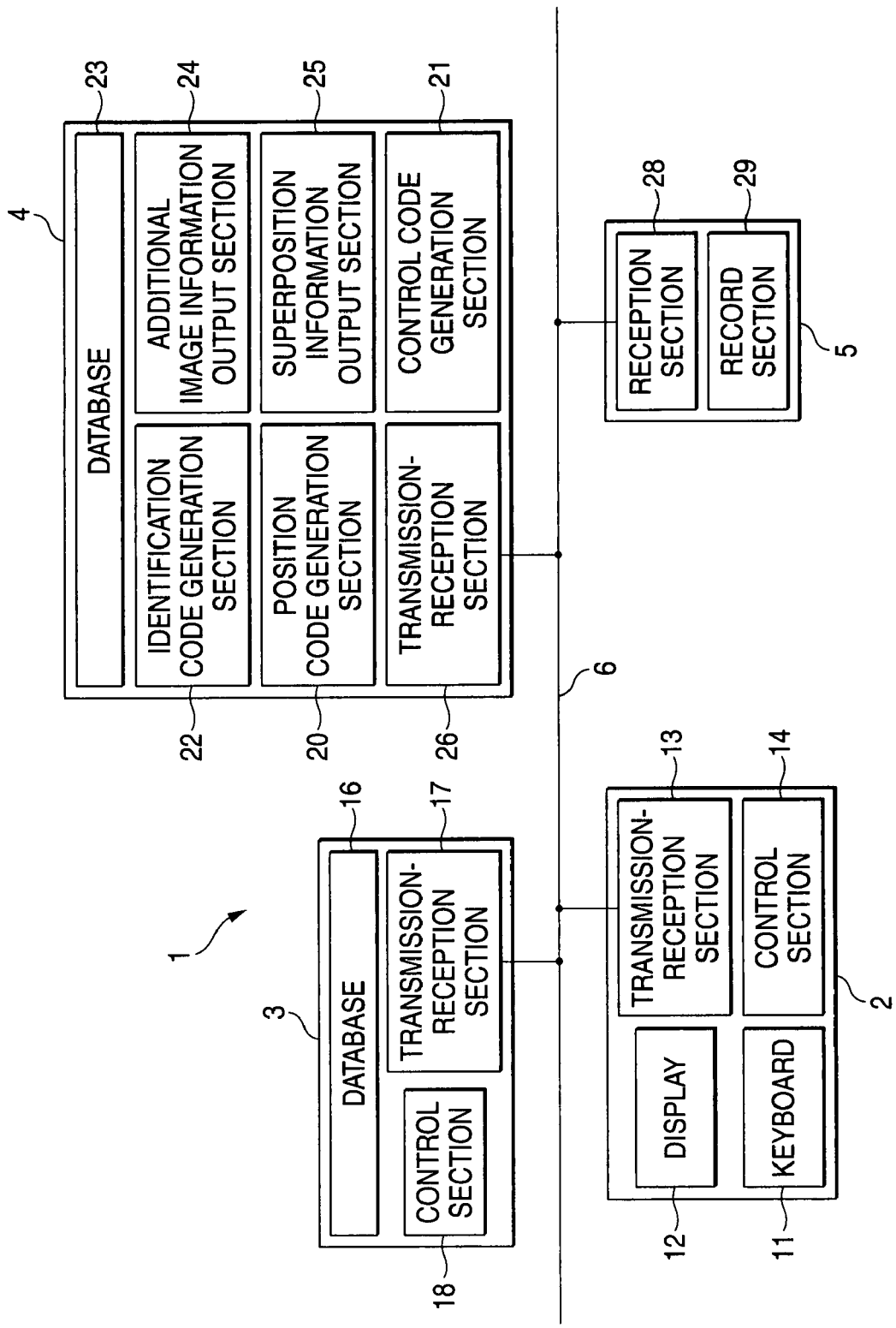
FIG. 13 is a block diagram to show a configuration example of a print document information recording system.

Generation of the information (code pattern image) to be recorded on a recording medium has been described. Then, a print document information recording system 1 as an example of an information record system for actually recording the information thus generated will be described. FIG. 13 shows a configuration example of the print document information recording system 1 including a multifunction machine and various servers for storing and managing information.

The print document information recording system 1 includes a terminal 2 for inputting a print command of an electronic document stored in a document management server 3, and the document management server 3 for transmitting the electronic document which is requested to be printed and attribute information of the electronic document to an identification information management server 4. The print document information recording system 1 also includes the identification information management server 4 for assigning the identification information to the electronic document to be printed, registering the identification information, and printing the electronic document, and a multifunction machine 5 for generating an image from received PDL and printing out the image on a sheet of paper as a print image. These components are connected through a network 6. The document management server 3 and the identification information management server 4 have databases 16 and 23, respectively, for storing various document files.

The terminal 2 is implemented as a personal computer, etc., for example. The terminal 2 includes a keyboard 11 and a display 12 for accepting record input from the user, a transmission-reception section 13 for communicating with the two servers 3 and 4 and the multifunction machine 5, which are the components of the print document information recording system 1, through the network 6, and a control section (CPU) 14 for controlling the operation of the sections of the terminal 2. Upon reception of input of a record command from the user, the terminal 2 issues a command of recording (printing) a document file stored in the database 16 (described later) of the document management server 3, on a recording medium such as a sheet of paper.

The document management server 3 includes the database 16 for storing the document information and the attribution information in association with each other, and a transmission-reception section 17 for accepting a command from the terminal 2 and transmitting the document information, etc., to the network 6. The document management server 3 also includes a control section 18 for performing jobs such as extracting an electronic file from the database 16 in accordance with a command from the terminal 2. The document management server 3 extracts the electronic file specified by the terminal 2 from the database 16 and outputs (transmits) the electronic file through the network 6 to the identification information management server 4.

The identification information management server 4 includes the position code generation section 20 for generating the position codes unique to the recording positions on a recording medium and the control code generation section 21 for generating the control code that controls the operation of a machine, which reads information recorded on the recording medium. The identification information management server 4 also includes the identification code generation section 22 for generating the identification code that identifies the document information and the database 23 for storing the identification information and the attribution information in association with each other. The identification information management server 4 further includes the additional image information output section 24 for converting the position code, the control code, and the identification code into the first to third image information and outputting the first to third image information as additional image information, and the superposition information output section 25 for converting the input document information into the fourth image information, superposing the additional image information and the fourth image information, and outputting the resultant superposition information. The identification information management server 4 further includes a transmission-reception section 26 for receiving the electronic document file transmitted from the document management server 3 through the network 6 and transmitting the output superposition information through the network 6 to the multifunction machine 5. The identification information management server 4 assigns identification information to the document file to be recorded (printed), registers the identification information, and records (prints) the document file.

The multifunction machine 5 is a machine having the functions of a copier, a FAX, a printer, and a scanner combined in a single device. The multifunction machine 5 includes a reception section 28 for receiving the document file from the identification information management server 4 through the network 6 and a recording section 29 for recording (printing) the received document file on a recording medium such as a sheet of paper. The multifunction machine 5 records the document file received from the identification information management server 4 through the network 6, onto a recording medium.

(Method of Recording Method of Print Document Information)

Figure 14:
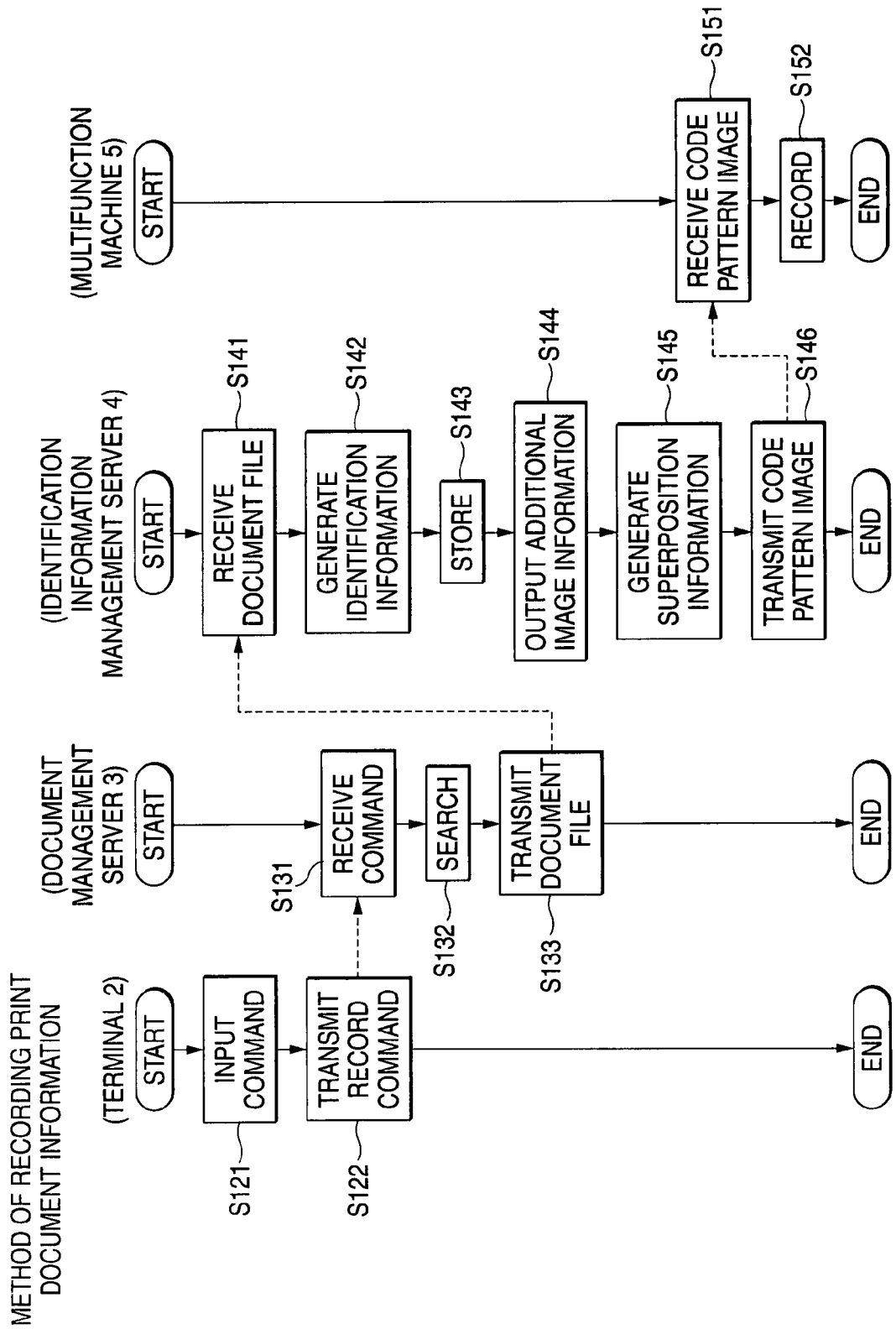
FIG. 14 is a flowchart of a method of recording print document information executed by the print document information recording system shown in FIG. 13.

A method of recording print document information executed by the described print document information recording system 1 will be described below with reference to FIG. 14. FIG. 14 is a flowchart of the method of recording print document information.

When the user inputs a record command of a print document on a recording medium through the terminal 2 (command input step) (step 121), the terminal 2 instructs the document management server 3 to transmit a certain document file to the identification information management server 4 (record command transmission step) (step 122).

The document management server 3 receives the command from the terminal 2 (command reception step) (step 131) and searches the database 16 for the specified document file and attribute information of the document file (search step) (step 132). The document management server 3 transmits the found document file and the found attribute information to the identification information management server 4 (document file transmission step) (step 133). The attribute information is information such as a storage location of the electronic document, print setting of the electronic document, and/or layout information of the electronic document.

The identification information management server 4 receives the document file and the attribute information (document file reception step) (step 141). The identification code generation section 22 generates an identification code based on the received document file and the received attribute information (identification information generation step) (step 142).

The generated identification information is stored in the database 23 in association with the attribute information of the document file (storage step) (step 143).

Further, the additional image information output section 24 converts position codes, a control code, and an identification code into first to third image information and outputs a code pattern image as additional image information (additional image information output step) (step 144). Then, the superposition information output section 25 converts the document information of the document file externally acquired into fourth image information, superposes and converts the additional image information and the fourth image information into a print description language, and generates and outputs the superposition information (superposition information generation step) (step 145). The superposition information contains the code pattern image generated from the identification information.

The transmission-reception section 26 of the identification information management server 4 transmits the code pattern image to the multifunction machine 5 (code pattern image transmission step) (step 146).

The multifunction machine 5 receives the code pattern image from the identification information management server 4 through the network 6 (code pattern image reception step) (step 151) and records (prints) the code pattern image on a recording medium by the recording section 29 (record step) (step 152).

At the identification information generation step (step 142), the identification information management server 4 adds a different identification code to each sheet of printout paper. For example, if 5 copies of a 10-page electronic document are printed out in 2-UP, 25 identification codes (10 pages÷2×5=25) are generated. The generated identification codes are stored in the database 23 of the identification information management server 4 in association with the attribute information of the received document file.

In the example, the code pattern image is generated in the identification information management server 4, but may also be generated in the multifunction machine 5. In this case, the multifunction machine 5, which may serve as a code pattern generation apparatus, further includes the recording section 29 (described later) for recording the superposition information on a recording medium such as a sheet of paper. The identification information is added to the print description language generated from the electronic document and transmitted to the multifunction machine 5. The multifunction machine 5 receives the transmitted print description language in the reception section 28 (described later), and the additional image information output section 24 generates a code pattern image from the identification information. The recording section 29 records the code pattern image on a sheet of paper. In this case, the second image information of the control code and the first image information of the position codes may be formed with different color materials. A machine that reads the information recorded on the sheet of paper may distinguish between the control code and the position codes based on the color materials and may remove the control code at the preceding stage of the synchronization process. Thereby, the calculation load of the later steps of the synchronization process, etc., can be lightened. The infrared absorption amount of the color material used for the image information of the control code may be half or less as compared with that of the color material used for the image information of the position codes. The machine, which reads the information recorded on the sheet of paper, may distinguish between the control code and the position codes based on difference in the infrared absorption amount and may remove the control code at the preceding stage of the synchronization process. Thereby, the calculation load of the later steps of the synchronization process can be lightened.

The code pattern image can also be generated by the document management server 3. In this case, the document management server 3 transmits only the attribute information of the electronic document to the identification information management server 4. The identification information management server 4 calculates the necessary number of pieces of identification information from the received attribute information and associates the received attribute information and issued identification information with each other and transmits the identification information to the document management server 3. The document management server 3 generates a code pattern image from the received identification information, extracts electronic document information from the database 16 (described later) in the document management server 3, and transmits the electronic document information together with the generated code pattern image to the multifunction machine 5. If the code pattern image generation apparatus is one other than the document management server 3 (if the code pattern image generation apparatus is the identification information management server 4 or the multifunction machine 5), document information is not previously stored in the code pattern image generation apparatus and thus is input from the document management server 3.

In the exemplary embodiment, the position code generation section 20 generates a position code, but the invention is not limited thereto. The position code may be input from an external unit.

In the exemplary embodiment, the control code generation section 21 generates a control code, but the invention is not limited thereto. The control code may be input from an external unit.

In the exemplary embodiment, the identification code generation section 22 generates an identification code, but the invention is not limited thereto. The identification code may be input from an external unit.

The presence or absence of a control code to be embedded in the code pattern image and a kind of the control code to be embedded in the code pattern image can be determined by a kind of an electronic document to be printed (general document or secret document). That is, whether the document is a general document or a secret document can be determined based on the presence or absence of the control code and the kind of identification code. The presence or absence of the control code and the kind of control code can be determined in accordance with the determination result. If the document is a secret document, duplication and scan may be prohibited in accordance with a control signal.

(Decoding Process and Operation Control)

Figure 15:
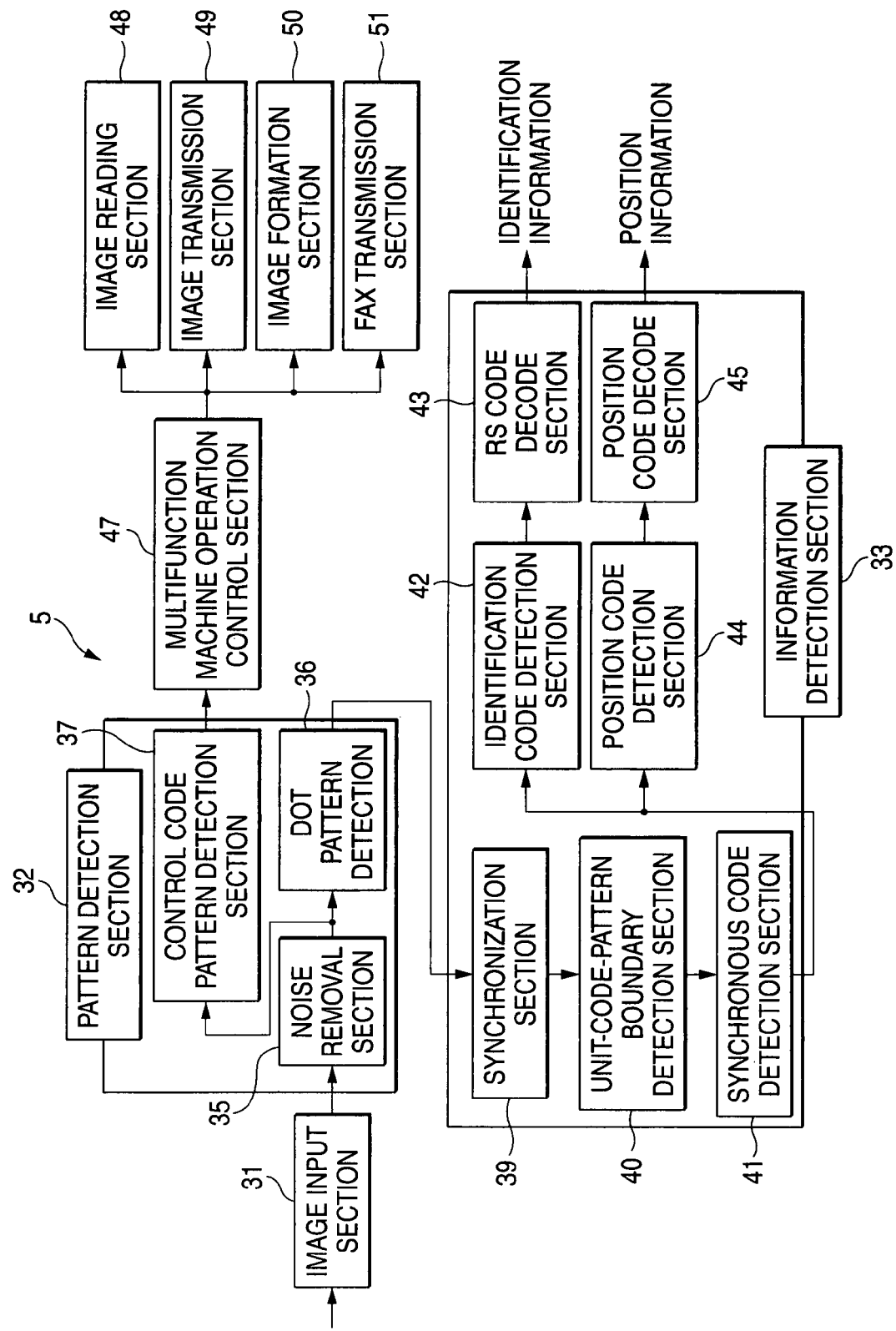
FIG. 15 is a functional block diagram of a multifunction machine that executes a decoding process for a control code and a position code and executes operation control.

Described will be a decoding process of the control code and the position code and an operation control that are executed by the information reading system according to the exemplary embodiment of the invention when the information reading system reads a recording medium such as a sheet of paper on which a control code and position codes are recorded. The decoding process may be executed either in an electronic pen or in a multifunction machine (or both). The multifunction machine 5, which may serve as the information reading system according to the exemplary embodiment of the invention, is taken as an example to describe a point that the operation of a machine, which reads information recorded on the sheet of paper, is controlled according to acquired control information. FIG. 15 is a functional block diagram of the multifunction machine 5 for executing the decoding process of a control code and position codes, and executing an operation control.

The multifunction machine 5, which may serve as the machine, which reads information recorded on the sheet of paper, includes an image input section 31, which may serve as a reading section for reading a code pattern image printed on a sheet of paper, and a noise removal section 35 for removing noise contained in the read image. The multifunction machine 5 also includes a dot pattern detection section 36 for detecting a dot pattern (dot image position) from the image and a control code pattern detection section 37, which may serve as a control information area detection section for detecting a control code area from the image whose noise is removed and serve as a control information detection section for detecting a control code pattern from the detected control code area. The multifunction machine 5 further includes a synchronization section 39 for synchronizing the detected dot patterns on a two-dimensional array and a unit-code-pattern boundary detection section 40 for detecting a boundary between unit code patterns that form a code block. The multifunction machine 5 further includes a synchronous code detection section 41 for detecting a synchronous code, an identification code detection section 42 for acquiring an identification code with using the position of the synchronous code as a reference, and an RS code decode section 43 for decoding the identification code and outputting identification information. The multifunction machine 5 further includes a position code detection section 44 for acquiring position codes with using the position of the synchronous code as a reference, and a position code decode section 45 for outputting a value provided by making offset correction to the positions based on the synchronous code, as position information. The multifunction machine 5 further includes a multifunction machine control section 47 which may serve as an operation control section for controlling the operation of the multifunction machine 5, an image reading section 48, an image transmission section 49, an image formation section 50, and a FAX transmission section 51.

A pattern detection section 32 includes the noise removal section 35, the dot pattern detection section 36, and the control code pattern detection section 37. An information detection section 33 includes the synchronization section 39, the unit-code-pattern boundary detection section 40, the synchronous code detection section 41, the identification code detection section 42, the RS code decode section 43, the position code detection section 44, and the position code decode section 45.

The image input section 31 may be implemented as an imaging device such as a CCD (Charge Coupled Device) or CMOS (Complementary Metal Oxide Semiconductor), to read and output a code pattern image printed on a sheet of paper.

The noise removal section 35 removes noise caused by variations in sensitivity of the imaging device and caused by an electronic circuit. A method of the noise removal process is selected in response to the characteristic of the imaging system. For example, blurring processing, sharpening processing of unsharp masking, etc., or the like is available.

The dot pattern detection section 36 performs a binarization process of an image, separates a dot pattern image portion and a background image portion, and detects a position of the dot pattern from a position of each binarized image. Since the binarized image may contain a large number of noise components, filtering for determining a dot pattern based on the area and the shape of the binarized image may be performed in combination (filtering based on area and shape). If a control code is not a combination of unit code patterns (see FIG. 8), the control code is removed as noise. If the control code pattern is formed with an infrared non-absorption material and the position code pattern and the identification code pattern are formed with an infrared absorption material, an imaging system having sensitivity in an infrared region is used to remove the control code pattern at the image input stage (noise removal using infrared absorption degree).

The synchronization section 39 refers to the positions of the detected dot patterns and synchronizes the dot patterns on a two-dimensional array. The term "synchronize" is used to mean a process of replacing the dot patterns detected as images with digital data on the two-dimensional array in such a manner that the position where each dot pattern exists is replaced with "1" and the position where no dot pattern exists is replaced with "0." The synchronization process will be described later.

The unit-code-pattern boundary detection section 40 detects a boundary between the unit code patterns forming a code block from the dot patterns expanded on the two-dimensional array. Positions of rectangular separators each having the same size as the unit code pattern are moved appropriately on the two-dimensional array output by the synchronization section 39. The positions where the numbers of dots contained in the separators are uniform are detected as positions of boundaries between the unit code patterns. The information embedding system may be determined in such a manner that if the uniform number of dots is two, the code pattern is a code pattern in which information is embedded using the unit code patterns as $_9C_2$ and that if the uniform number of dots is three, the code pattern is a code pattern in which information is embedded using the unit code patterns as $_9C_3$. If the control code is a unit code pattern combination (see FIG. 6), the unit-code-pattern boundary detection section 40 removes the control code pattern by a method described later.

The synchronous code detection section 41 refers to the kind of each unit code pattern detected from the two-dimensional array and detects a synchronous code. The synchronous code detection section 41 detects the orientation of the code pattern (90-degree units) according to which of the four kinds of synchronous codes shown in FIG. 3 is detected, and corrects the orientation. The identification code detection section 42 and the position code detection section 44 acquire an identification code and a position code, respectively from the code pattern whose angle is corrected, with using the position of the synchronous code as a reference. The RS code decode section 43 decodes the detected identification code using the same parameters as those used in the coding processing of RS code previously described with reference to FIG. 9 (the number of blocks, etc.,), and outputs identification information. The position code decode section 45 extracts a partial sequence of M sequence from the position code acquired by the position code detection section 44, refers to the position of the detected partial sequence relative to the M sequence used in the image generation, and outputs a value provided by making offset correction to the position of the partial sequence based on the synchronous code (because synchronous code is placed between position codes) from the position of the partial sequence, as position information.

The control code pattern detection section 37 detects a control code pattern from the image from which noise is removed by the noise removal section 35. That is, since the control code pattern is a predetermined fixed pattern as shown in FIGS. 6 and 8, first the control code pattern detection section 37 determines the control code block based on the synchronous code, the X position code, and the Y position code to detect the control code area shown in FIGS. 5 and 7. The control code pattern detection section 37 may perform a known pattern matching process in accordance with the detected control code area, to thereby detect the control code pattern easily. The control code pattern detection section 37 transmits the detection result to the multifunction machine control section 47. If the control code pattern is detected, the kind of detected control code is transmitted. Alternatively, if it is previously known that only one kind of a control code indicating "stop the operation of the multifunction machine" is provided as a control code, a signal to stop the operation of the multifunction machine 5 is output.

The multifunction machine control section 47 controls the operation of the multifunction machine 5 in accordance with a signal received from the control code pattern detection section 37. For example, if the control code is a code indicating "copy prohibited," the multifunction machine control section 47 stops the operation of the image reading section 48 and the image formation section 50. If the control code is a code indicating "scan prohibited," the multifunction machine control section 47 stops the operation of the image reading section 48 and the image transmission section 49. If the control code indicates "FAX prohibited," the multifunction machine control section 47 stops the operation of the image reading section 48 and the FAX transmission section 51.

To perform a process of enhancing the copy speed and/or the scan speed without degrading the productivity of the multifunction machine 5, a process performed by the control code pattern detection section 37 must be particularly at high speed. To speed up the process performed by the control code pattern detection section 37, the pattern detection section 32 may be implemented as hardware of an ASIC (Application-Specific Integrated Circuit), an FPGA (Field Programmable Gate Array; programmable LSI), a DSP (Digital Signal Processor; microprocessor specialized for processing of audio, image, etc.,), or the like, because the process performed by the pattern detection section 32 is simple image processing of binarization, pattern matching, etc., and thus is suited to hardware processing.

The information detection section 33 may be implemented in the multifunction machine 5 or may be implemented as a server installed outside the multifunction machine 5. To implement the information detection section 33 in the multifunction machine 5, the information detection section 33 may be implemented as hardware like the shown pattern detection section 32 or may be implemented as software executed by the CPU in the multifunction machine 5.

(Method of Decoding Process)

A method of a decoding process executed by the multifunction machine 5 will be described below with reference to a flowchart of FIG. 16.

When the image input section 31 of the multifunction machine 5 reads a code pattern image printed on a sheet of paper (image input step) (step 161), the noise removal section 35 removes noise contained in the read image and outputs the resultant image (noise removal step) (step 162). The dot pattern detection section 36 detects positions of dot patterns from the image from which noise is removed (dot pattern detection step) (step 163). The synchronization section 39 synchronizes (expands) the detected dot patterns on a two-dimensional array (synchronization step) (step 164). The unit-code-pattern boundary detection section 40 detects a boundary between unit code patterns from the dot patterns expanded on the two-dimensional array (unit-code-pattern boundary detection step) (step 165). The synchronous code detection section 41 refers to kinds of the unit code patterns detected from the two-dimensional array, detects a synchronous code, and makes an angle correction (synchronous code detection step) (step 166). Further, using the position of the synchronous code as a reference, the identification code detection section 42 detects an identification code from the code pattern whose angle is corrected (identification code detection step) (step 167). The RS code decode section 43 decodes the identification code and outputs identification information (RS code decode step) (step 168). Further, the position code detection section 44 detects a position code (position code detection step) (step 169). The position code decode section 45 makes offset correction to the position based on the synchronous code and outputs position information (position code decode step) (step 170).

(Synchronization Process)

The synchronization step (step 164) executed by the synchronization section 39 will be further described with reference to the accompanying drawings. FIG. 17 is a drawing to show an outline of the synchronization step executed by the synchronization section 39 shown in FIG. 15. The synchronization section 39 applies a virtual lattice to the dot pattern detected by the dot pattern detection section 36 and checks as to whether or not a dot exists in each cell of the virtual lattice. The synchronization section 39 sets "0" to the cell where no dot exists, and sets "1" to the cell where a dot exists so as to generate a two-dimensional array.

The synchronization section 39 estimates the orientation of the virtual lattice from the dot pattern. As seen in FIGS. 1 and 2, when two dots are selected out of the code pattern, the two dots become closest to each other when the two dots are arranged adjacently side by side in the 0-degree direction or the 90-degree direction. Therefore, the closest dot pair can be detected from the detected dot patterns, and the inclination angle of the code pattern can be detected from the direction in which the dot pair directs and can be adopted as the direction of the lattice (determination of lattice direction).

Since a distance between the two closest dots is the dot spacing in the code pattern, the spacing of the lattice used in the synchronization process can be the spacing of the closest dot pair detected as described above (determination of lattice spacing).

(Detection of Boundary Between Unit Code Patterns (1))

FIG. 18 is a drawing to describe an outline of the unit-code-pattern boundary detection step (step 165) performed by the unit-code-pattern boundary detection section 40 shown in FIG. 15. FIG. 18A shows a code pattern of the exemplary embodiment formed of unit code patterns based on $_9C_2$. Although boundary detection is actually applied to the synchronized two-dimensional array made up of bit values "0" and "1" shown in FIG. 17, a dot pattern is used for intuitive understanding in the following description.

Figure 18A:
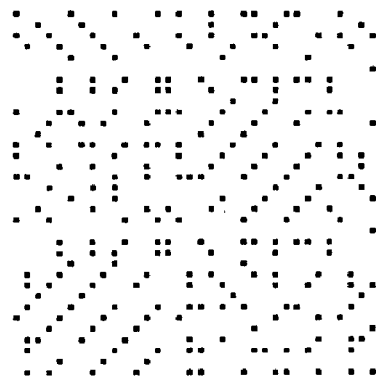
FIG. 18 is a drawing to describe an outline of a unit-code-pattern boundary detection step executed by a unit-code-pattern boundary detection section of the multifunction machine shown in FIG. 15.
Figure 18B:
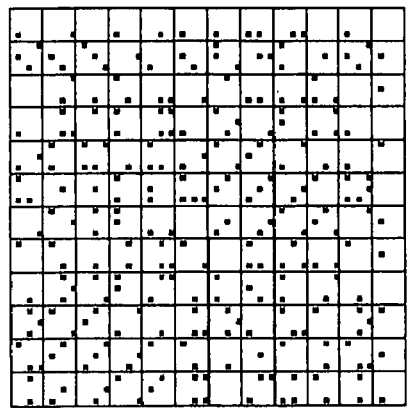
Figure 18C:
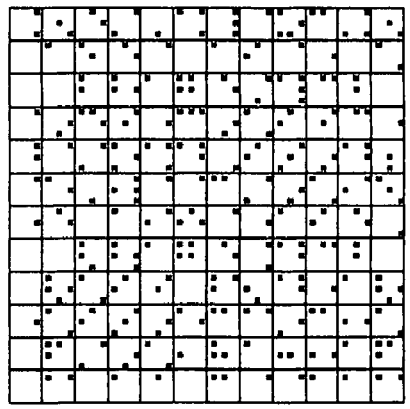
Figure 18D:
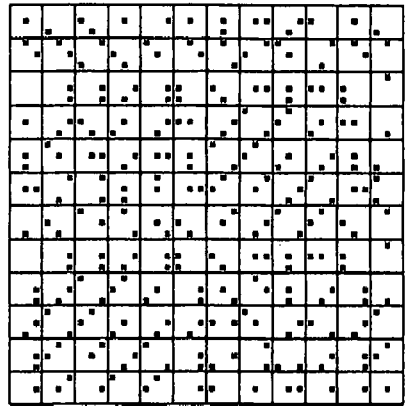

To decode the code pattern shown in FIG. 18A, first it is necessary to determine kinds of unit code patterns. To do this, a boundary between the unit code patterns is determined. FIGS. 18B to 18D show a process of determining a boundary between the unit code patterns. The process will be described below with reference to a flowchart of a method of determining a boundary between unit code patterns shown in FIG. 19:

A virtual lattice pattern including plural cells each having the same size as a unit code pattern is scanned over a code pattern (virtual lattice scanning step) (step 181). The number of dots contained in each cell is counted (count step) (step 182). For each lattice pattern, variations in the number of dots contained in the cells are counted (variation count step) (step 183). The lattice pattern at a position where the variations are the smallest is selected and is fixed (lattice pattern fixing step) (step 184). The fixed position becomes the position of the boundary between the unit code patterns (boundary position determination step) (step 185). To use the unit code patterns based on $_9C_2$, the number of dots contained in each cell becomes two at the correct lattice position (FIG. 18D). If the lattice position is not correct (FIGS. 18B and 18C), the number of dots varies in the range of 0 to seven.

After the position of the boundary between the unit code patterns is determined, each unit code pattern is examined and a synchronous code is detected (synchronous code detection step) (step 186). Rotation of the code pattern is determined according to which of the four kinds of synchronous codes is detected (rotation determination step) (step 187). After a rotation correction is made, a position code and an identification code are extracted (position code and identification code extraction step) (step 188). As shown in FIGS. 11 and 12, the code is an identification code or a control code depending on a position where the code pattern is read. Therefore, when the identification code is decoded, the control code acts as noise. However, placement of the control code relative to the position code is previously determined. Thereby, the control code can be easily removed from the detection result of the position code during decoding.

(Another Example of Detection of Boundary Between Unit Code Patterns)

FIG. 20 is a drawing to describe another example of the unit-code-pattern boundary detection step (step 165) executed by the unit-code-pattern boundary detection section 40 shown in FIG. 15. It is assumed that the control code pattern shown in FIG. 8 is to be detected. FIG. 20A shows a code pattern formed of unit code patterns base on $_9C_3$ as an example of another code pattern. Since the control code pattern is different from the unit code pattern in shape, it is difficult to decode the pattern as it is in FIG. 20A. Therefore, first it is necessary to remove only the control code patterns contained in FIG. 20A (see FIG. 20B).

Figure 20B:
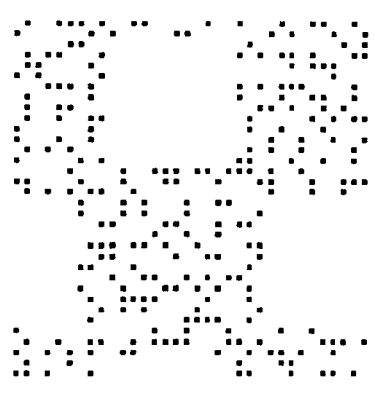
FIG. 20 is a drawing to describe another example of the boundary detection step executed by the unit-code-pattern boundary detection section shown in FIG. 15.
Figure 20A:
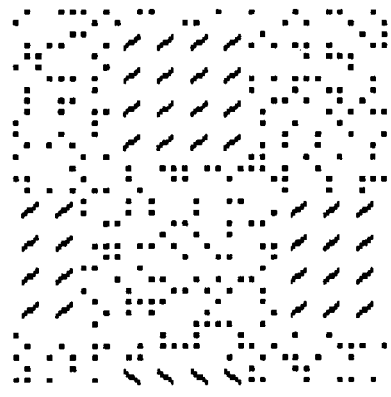

As a removal method, an area of each cluster of all pixels contained in the code pattern in FIG. 20A is calculated and only the control code patterns can be erased depending on the magnitude of the calculated areas (control pattern removal method 1) (filtering based on area and shape). Alternatively, if each control code pattern is formed with toners of yellow, magenta, and cyan (black provided by mixing the three colors) which have less absorbing infrared amount, and synchronous code, position code, and if identification code patterns are formed with toner of black containing carbon generally used and having much absorbing infrared amount, difference in the infrared radiation amount can be used to detect the code pattern for removing only the control code patterns (control pattern removal method 2) (noise removal using infrared absorption degree).

Figure 20E:
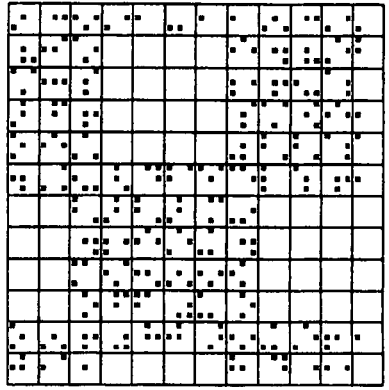
Figure 20D:
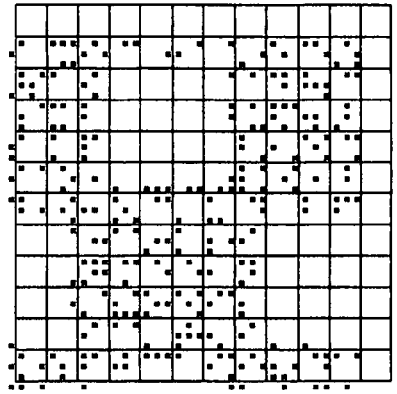
Figure 20C:
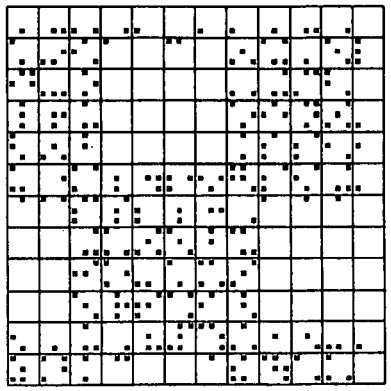

After the control code patterns are removed, the boundary between the unit code patterns can be detected according to a similar method to the method shown in FIG. 18. FIGS. 20C to 20E show the determination method. To use the unit code patterns based on $_9C_3$, the number of dots contained in each cell becomes three at the correct lattice position (FIG. 20E) in the lattice pattern fixing step and the boundary position determination step. If the lattice position is not correct (FIGS. 20C and 20D), the number of dots varies in the range of 0 to eight, which is different from the detection of the boundary between the unit code patterns previously described with reference to FIG. 18 (0 to seven).

(Operation Control Method)

Next, an operation control method executed by the multifunction machine 5 shown in FIG. 15 will be described below with reference to a flowchart of FIG. 21.

When the image input section 31 of the multifunction machine 5 reads a code pattern image printed on a sheet of paper (image input step) (step 201), the noise removal section 35 removes noise contained in the read image and outputs the image (noise removal step) (step 202). When the image whose noise is removed is input, the control code pattern detection section 37 detects a control code area (control code area detection step) (step 203). The control code pattern detection section 37 detects a control code pattern from the detected control code area and outputs the detection result to the multifunction machine control section 47 (control code pattern detection step) (step 204). The multifunction machine control section 47 controls the operation of the multifunction machine 5 in accordance with the signal received from the control code pattern detection section 37 (multifunction machine operation control step) (step 205).

Figure 16:
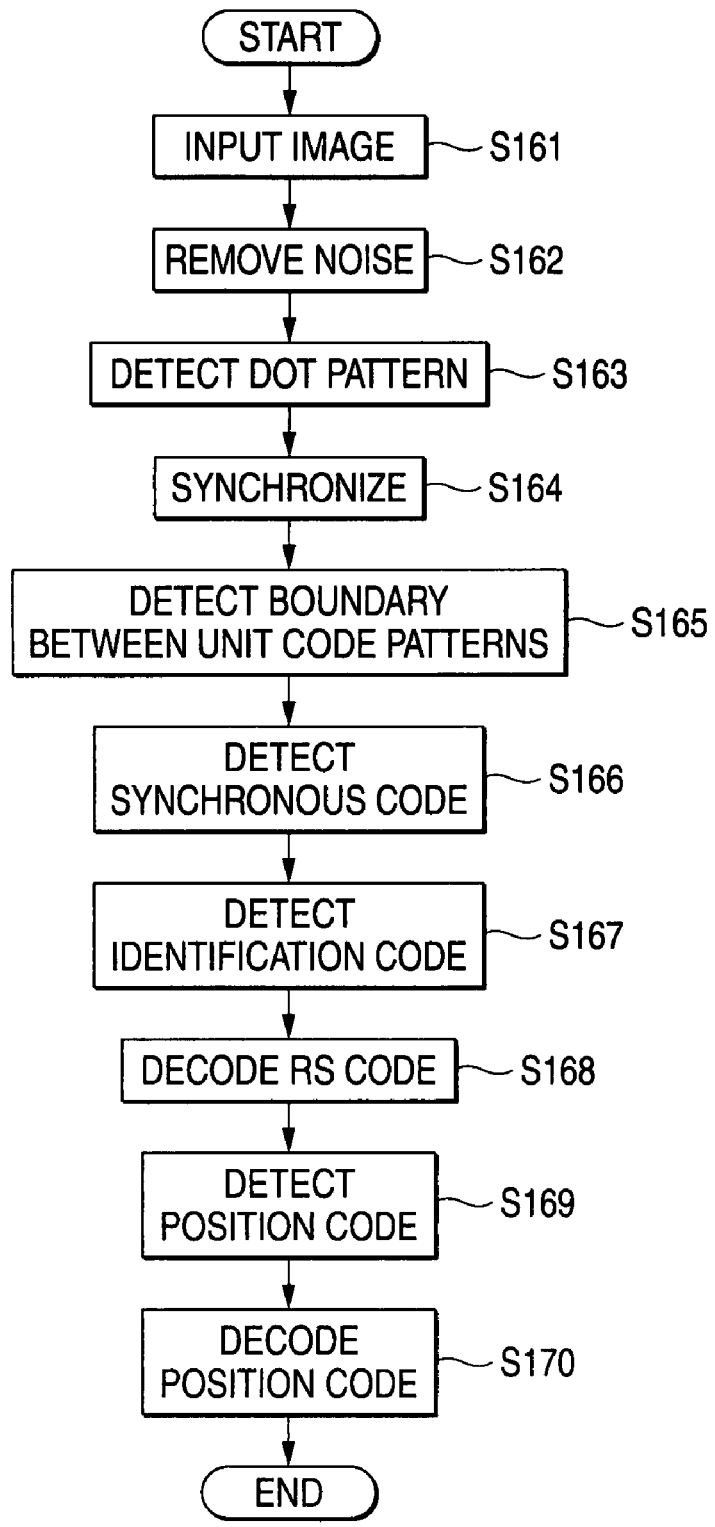
FIG. 16 is a flowchart to show a decoding process method executed by the multifunction machine shown in FIG. 15.

The image input step (step 201) and the noise removal step (step 202) in this flowchart are the same as the image input step (step 161) and the noise removal step (step 162) in the flowchart of the decoding process method shown in FIG. 16.

Thus, if a print document with a printed code pattern is copied, scanned, or transmitted with fax by the multifunction machine 5, the control code pattern detection section 37 installed in the multifunction machine 5 operates and controls the operation of the multifunction machine 5 as previously described with reference to FIG. 15.

With the multifunction machine 5 according to the exemplary embodiment, the image input section 31 reads information recorded on a sheet of paper and the control code pattern detection section 37 detects a control code area. The control code pattern detection section 37 detects a control code pattern from the detected control code area using known pattern matching processing and the multifunction machine control section 47 controls the operation of the sections of the multifunction machine 5 in accordance with the detected control code. Therefore, the operation of the sections of the multifunction machine 5 can be controlled by the control code recorded on the sheet of paper.

(Writing-Information Generation System)

Figure 22:
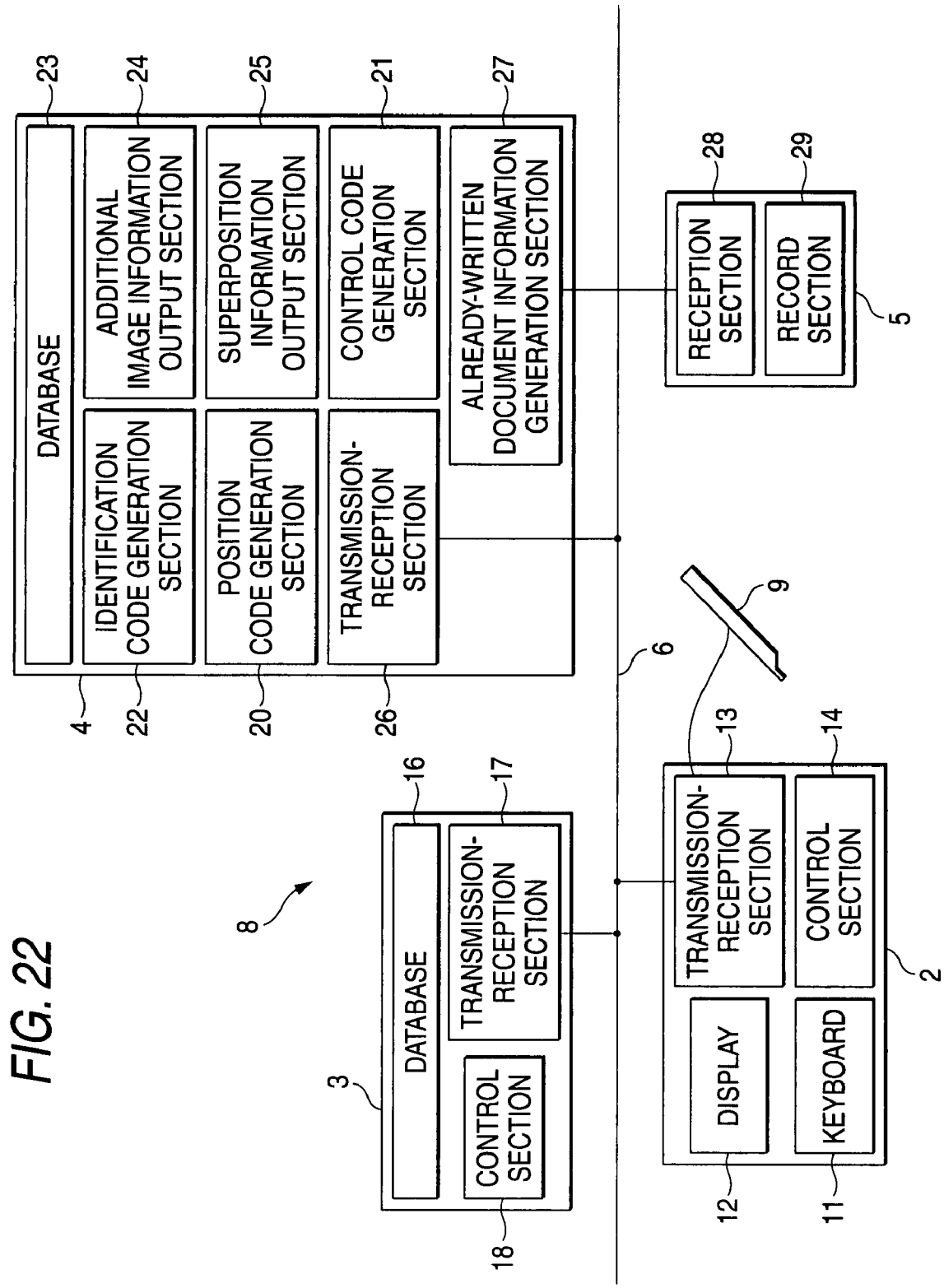
FIG. 22 is a block diagram to show a configuration example of a writing-information generation system.

Decoding of information read from a recording medium has been described. Then, a writing-information generation system for actually decoding the read information will be described. FIG. 22 is a block diagram to show a configuration example of a writing-information generation system 8. The writing-information generation system 8 is almost the same as the print document information recording system 1 shown in FIG. 13 except that the identification information management server 4 includes an already-written document information generation section 27 and that an electronic pen 9 is connected to the terminal 2. The configuration of the electronic pen 9 will be described with reference to FIG. 23.

(Configuration of Electronic Pen)

Figure 23:
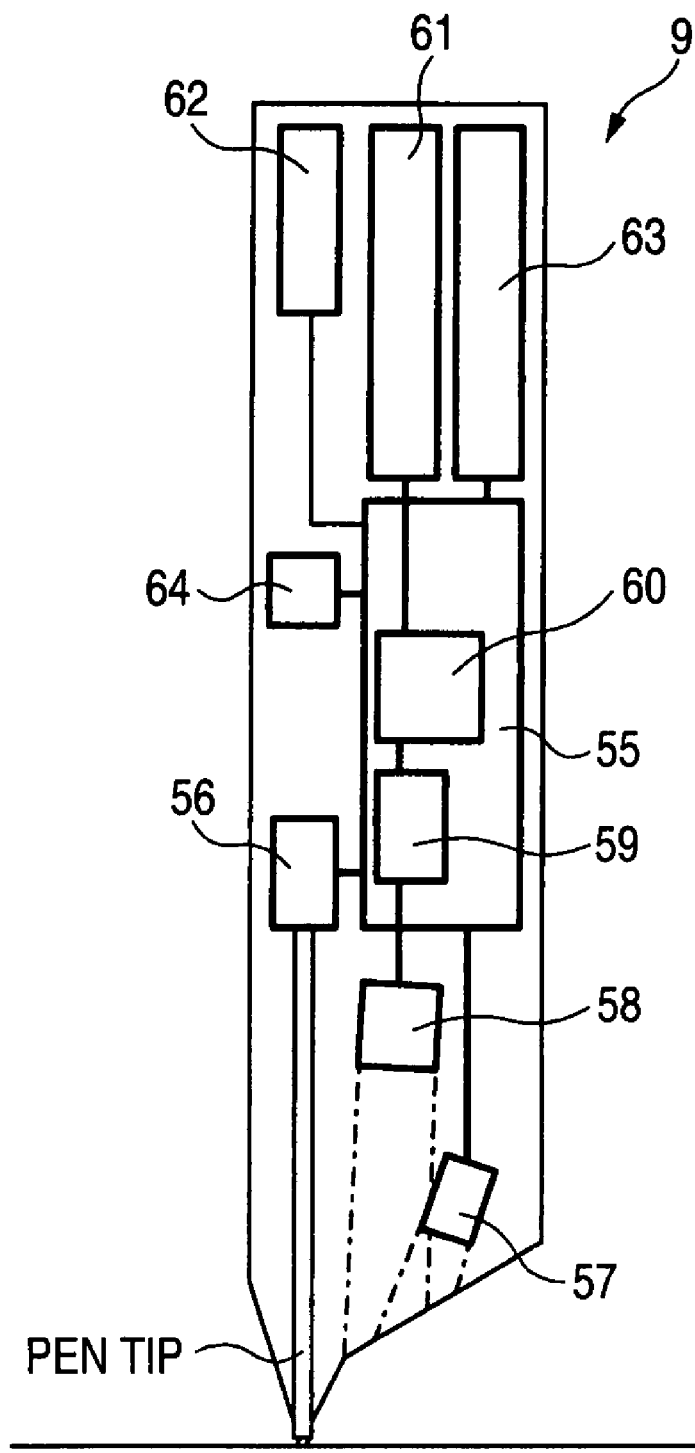
FIG. 23 is a diagram to show the configuration of an electronic pen used in an exemplary embodiment shown in FIG. 22.

FIG. 23 is a diagram to show the configuration of the electronic pen 9 according to the exemplary embodiment of the invention. The electronic pen 9 includes a control circuit 55 for controlling the operation of the electronic pen 9, a pressure sensor 56 for detecting writing operation, and an infrared LED 57 for lighting a paper face. The electronic pen 9 also includes an infrared CMOS 58, which may serve as an information acquisition section for acquiring information (image) recorded on a recording medium such as a sheet of paper, an image processing section 59 for detecting a code pattern from the acquired information, and a data processing section 60, which may serve as an information extraction section for extracting a position code and a control code from the code pattern, a control information exclusion section for outputting position code with control code excluded, and a writing-information generation section for generating writing information indicating the writing locus of the electronic pen 9 based on the position code. The electronic pen 9 further includes a memory 61 for storing writing information, a communication circuit 62 for communicating with an external unit, a battery 63 for driving the pen, and a pen ID memory 64.

To suppress power consumption, the infrared LED 57 goes on like a pulse in synchronization with the shutter timing of the infrared CMOS 58.

The infrared CMOS 58 is a CMOS sensor having sensitivity in an infrared region. An image is captured in cycles of about 70 to 100 fps (frames per second). CMOS of global shutter system capable of transferring a picked-up image at the same time as picking up the image is used. To decrease the effect of disturbance, a visible light cut filter is placed on the full face of the infrared CMOS 58. Here, the infrared CMOS is used as an imaging device, but the imaging device is not limited to the infrared CMOS; any other imaging device such as a CCD may be used.

The communication circuit 62 also receives external information. For example, a decode key to decode a code pattern is received through the communication circuit 62 from the outside and is stored in the memory 61 of the electronic pen 9. The electronic pen 9 reads an image at a rate of about 70 to 100 fps and thus can acquire a plurality of pieces of position information and identification information by one writing operation.

As the identification information, the same information is embedded independently of the position on a paper face and thus the data processing section 60 decides by majority a plurality of acquired pieces of identification information, thereby enhancing the reliability of the identification information. The position information varies from one position on a paper face to another, but the data processing section 60 checks continuity of the positions (coordinates) of adjacent position information produced by writing and detects and corrects information in a part where decoding results in failure. The continuity of the positions (continuity of writing operation) is recognized using the detection result of the writing pressure of the pressure sensor 56.

With the electronic pen 9 according to the exemplary embodiment, the infrared CMOS 58 acquires the information (image) recorded on a sheet of paper. The data processing section 60 excludes the control code from the code pattern detected by the image processing section 59, extracts the image code, and generates writing information. Therefore, writing information can be generated without receiving the influence of the control code.

(Writing-Information Generation Method)

Figure 24:
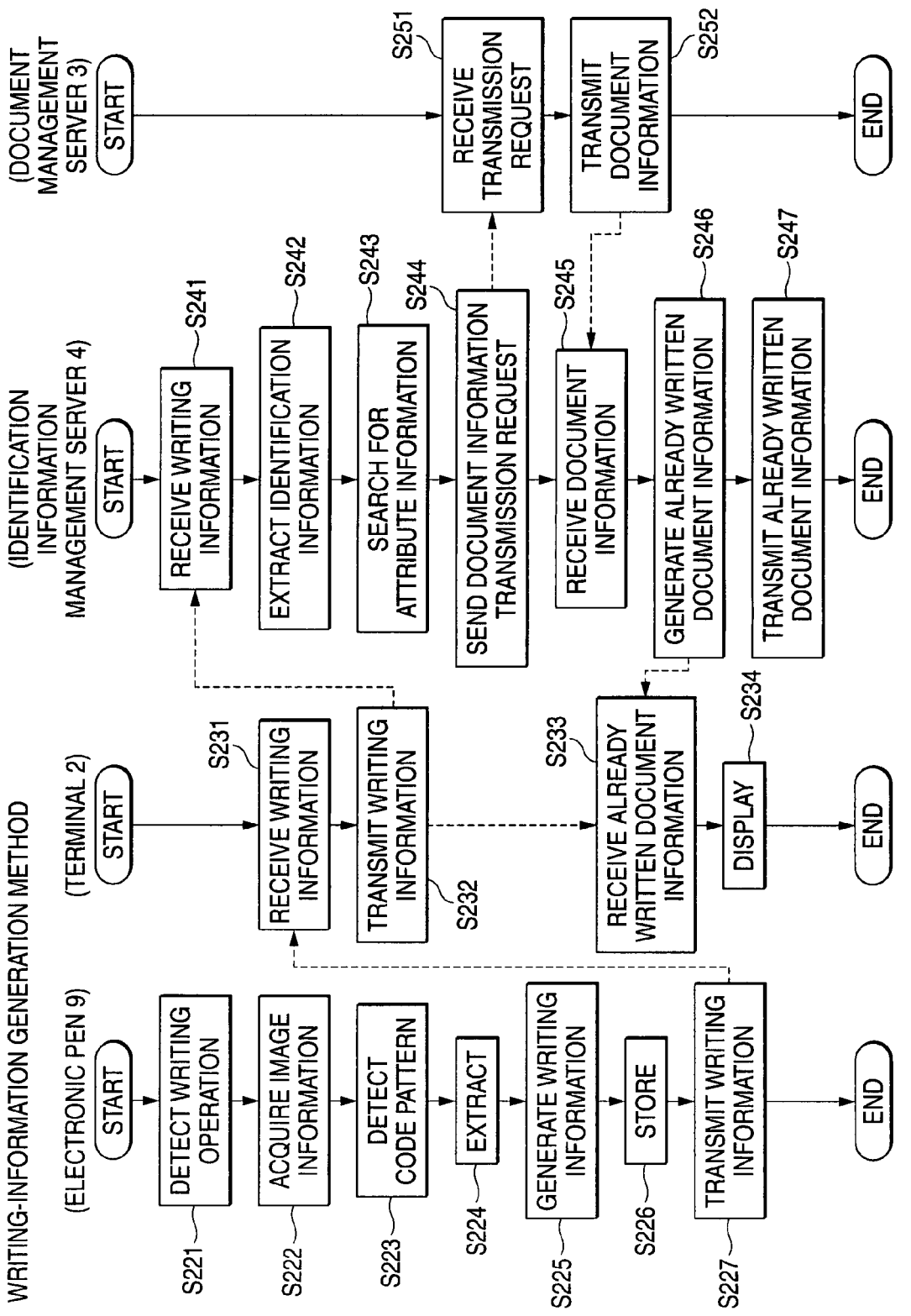
FIG. 24 is a flowchart of a writing-information generation method executed by the writing-information generation system shown in FIG. 22.

A writing-information generation method executed by the described writing-information generation system 8 will be described below with reference to FIG. 24. FIG. 24 is a flowchart of the writing-information generation method.

Using the electronic pen 9, the user writes on print paper on which image information (code pattern) is recorded by the print document information record method described above. The electronic pen 9 contains an ink tank (not shown) and leaves ink on the print paper as a writing trace as the user writes. At the same time, the pressure sensor 56 detects whether or not the pen point is in contact with the paper face (writing operation detection step) (step 221).

When contact is detected, the electronic pen 9 lights the infrared LED 57 and the infrared CMOS 58 picks up an image on the paper face and acquires image information (image information acquisition step) (step 222).

The image processing section 59 detects a code pattern image from the picked-up image information (code pattern detection step) (step 223).

The data processing section 60 decodes the detected code pattern image and extracts the position code and the identification code embedded in the code pattern image (extraction step) (step 224). At this time, the control information (control code) is removed as noise.

The data processing section 60 detects the writing trace of the electronic pen 9 from the position code acquired at the extraction step and generates writing information together with identification code (writing-information generation step) (step 225). The control circuit 55 stores the writing information in the memory 61 (storage step) (step 226).

The communication circuit 62 of the electronic pen 9 transmits the writing information to the terminal 2 (writing information transmission step) (step 227).

The terminal 2 receives the writing information transmitted from the electronic pen 9 (writing information reception step) (step 231) and transmits the writing information to the identification information management server 4 (writing information transmission step) (step 232).

The identification information management server 4 receives the transmitted writing information (writing information reception step) (step 241) and extracts identification information from the writing information (identification information extraction step) (step 242).

Subsequently, the identification information management server 4 searches for attribute information of document information corresponding to the identification information (attribute information search step) (step 243).

The identification information management server 4 requests a document management server 3 to transmit the corresponding document information to the identification information management server 4 based on the found attribute information (document information transmission request step) (step 244) and upon reception of the request (transmission request reception step) (step 251), the document management server 3 transmits the corresponding document information to the identification information management server 4 (document information transmission step) (step 252).

The identification information management server 4 receives the document information transmitted from the document management server 3 (document information reception step) (step 245).

The already-written document information generation section 27 of the identification information management server 4 generates already written document information provided by reflecting the writing trace of the electronic pen 9 on the original document information based on the received document information and the writing information generated at the writing-information generation step (step 225) (already written document information generation step) (step 246).

The identification information management server 4 transmits the generated already written document information to the terminal 2 (already written document information transmission step) (step 247) and the terminal 2 receives the already written document information (already written document information reception step) (step 233) and displays the already written document information on a display 12 (display step) (step 234).

Before the writing-information generation processing, the already-written document information generation section 27 may determine whether or not an already written electronic document exists and when the already-written document information generation section 27 determines that an already written electronic document exists, it may reflect the current acquired writing information on the already written electronic document. The already-written document information generation section 27 may inquire of the user through the terminal 2 whether or not a new already written electronic document is to be generated or whether or not writing information is to be added to the detected already written electronic document. The already written electronic document can be easily acquired as the attribute information of the already written electronic document (storage location) is previously registered in a database 23.

The already written electronic document is generated in a format in which the portion corresponding to the original electronic document can be edited. Writing information can be later added to an already written electronic document (in the PDF document format of Adobe systems, DocuWorks format of Fuji Xerox, etc.,) although the portion of the electronic document cannot be edited. For example, when information written on paper is once electronized and then information is again written on the same paper, the added writing information can be added onto the already written electronic document.

The program corresponding to the procedure shown in the flowchart of FIG. 10 is recorded on an information recording medium of a flexible disk, a hard disk, or the like or is distributed through a network such as the Internet for record and is read and executed by a general-purpose computer, etc., of the code pattern image generation apparatus 10, whereby the computer, etc., can also be caused to function as a part of the code pattern image generation apparatus 10.

The program corresponding to the procedure shown in the flowchart of FIG. 14 is recorded on an information recording medium of a flexible disk, a hard disk, or the like or is distributed through a network such as the Internet for record and is read and executed by a general-purpose computer, etc., of the print document information recording system 1, whereby the computer, etc., can also be caused to function as a part of the print document information recording system 1.

Figure 19:
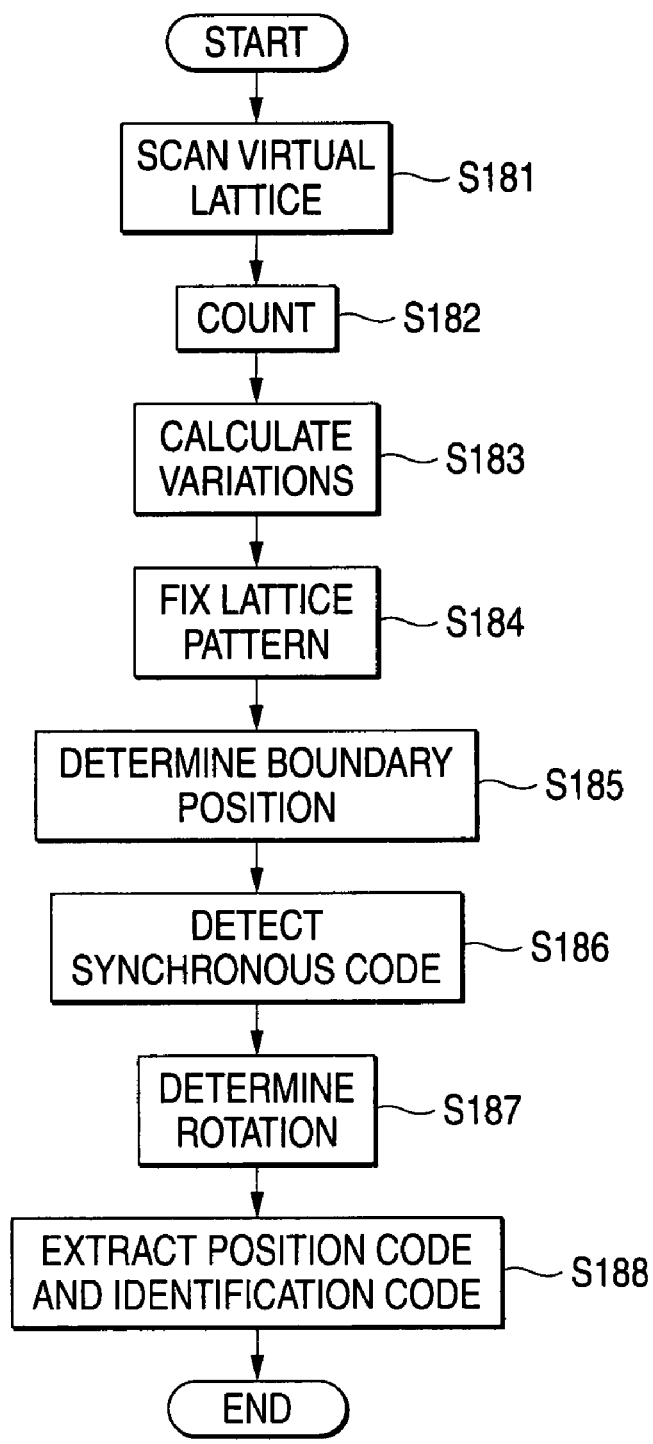
FIG. 19 is a flowchart of a determination method in the unit-code-pattern boundary detection step shown in FIG. 18.
Figure 21:
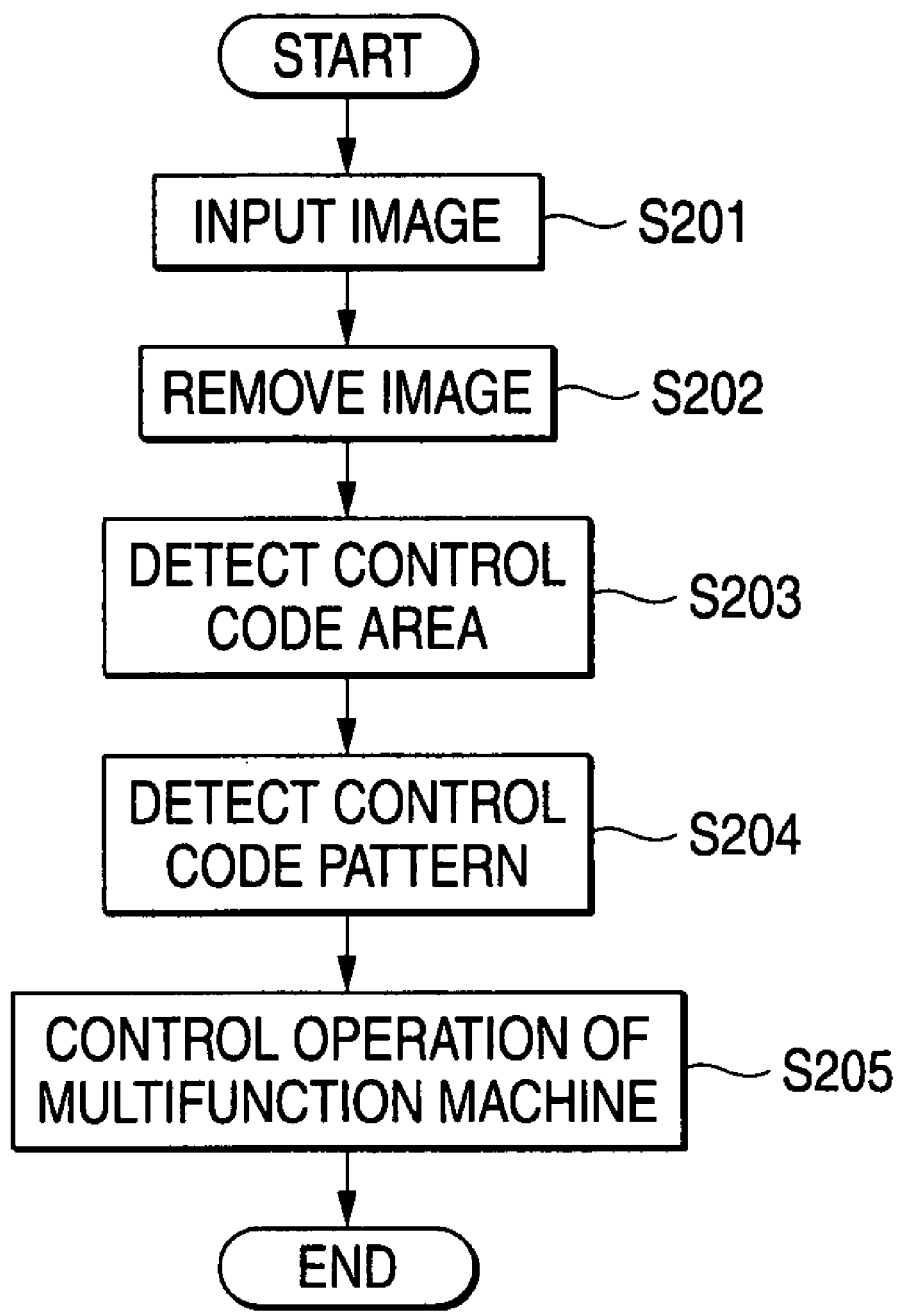
FIG. 21 is a flowchart to show an operation control method executed by the multifunction machine shown in FIG. 15.

The program corresponding to the procedures shown in the flowcharts of FIGS. 16, 19, and 21 is recorded on an information recording medium of a flexible disk, a hard disk, or the like or is distributed through a network such as the Internet for record and is read and executed by a general-purpose computer, etc., of the multifunction machine 5, whereby the computer, etc., can also be caused to function as a part of the multifunction machine 5.

The program corresponding to the procedure shown in the flowchart of FIG. 24 is recorded on an information recording medium of a flexible disk, a hard disk, or the like or is distributed through a network such as the Internet for record and is read and executed by a general-purpose computer, etc., of the writing-information generation system 8, whereby the computer, etc., can also be caused to function as a part of the writing-information generation system 8.

FIG. 1

1. $_9C_2$=36 COMBINATIONS OF PLACED DOTS
2. 32 KINDS
3. FIVE BITS (32 KINDS) FOR EMBEDDING INFORMATION

4. FOUR KINDS
5. USE AS SYNCHRONOUS CODE
  FIG. 2
DOT PLACEMENTS THAT UNIT CODE PATTERN CAN TAKE
  FIG. 4
1. EXAMPLE OF IDENTIFICATION CODE BLOCK
2. SYNCHRONOUS CODE
3. X POSITION CODE
4. Y POSITION CODE
5. IDENTIFICATION CODE
  FIG. 5
1. EXAMPLE OF CONTROL CODE BLOCK
2. SYNCHRONOUS CODE
3. X POSITION CODE
4, Y POSITION CODE
5. CONTROL CODE
  FIG. 7
1. ANOTHER EXAMPLE OF CONTROL CODE BLOCK
2. SYNCHRONOUS CODE
3. X POSITION CODE
4. Y POSITION CODE
5. CONTROL CODE
  FIG. 9
20 POSITION CODE GENERATION SECTION
21 CONTROL CODE GENERATION SECTION
22 IDENTIFICATION-CODE-GENERATION SECTION
24 ADDITIONAL IMAGE INFORMATION OUTPUT SECTION
25 SUPERPOSITION INFORMATION OUTPUT SECTION
71 M SEQUENCE CODING SECTION
72 BLOCK DIVIDING SECTION
74 BLOCK DIVIDING SECTION
75 RS CODING SECTION
A. OUTPUT
B. TEXT INFORMATION INPUT
  FIG. 10
A. METHOD OF GENERATING CODE PATTERN IMAGE
B. START
S101 PERFORM M SEQUENCE CODING
S102 PERFORM BLOCK DIVIDING
S103 GENERATE CONTROL INFORMATION
S104 PERFORM BLOCK DIVIDING
S105 PERFORM RS CODING
S106 PERFORM BLOCK COMBINING
S107 SELECT CODE PATTERN
S108 GENERATE OUTPUT IMAGE
S109 OUTPUT SUPERPOSITION INFORMATION
C. END
  FIG. 11
A. EXAMPLE OF COMBINING CODE BLOCKS
B. X DIRECTION M SEQUENCE
C. SYNCHRONOUS CODE
D. Y DIRECTION M SEQUENCE
E. IDENTIFICATION CODE
F. CONTROL CODE
G. CONTROL CODE 1
H. CONTROL CODE 0
  FIG. 12
A. X DIRECTION M SEQUENCE
B. SYNCHRONOUS CODE
C. Y-DIRECTION M SEQUENCE
D. IDENTIFICATION CODE
E. CONTROL CODE
F. CONTROL CODE 1
G. CONTROL CODE 0
  FIG. 13
11 KEYBOARD
12 DISPLAY
13 TRANSMISSION-RECEPTION SECTION
14 CONTROL SECTION
16 DATABASE
17 TRANSMISSION-RECEPTION SECTION
18 CONTROL SECTION
21 CONTROL CODE GENERATION SECTION
22 IDENTIFICATION CODE GENERATION SECTION
23 DATABASE
24 ADDITIONAL IMAGE INFORMATION OUTPUT SECTION
25 SUPERPOSITION INFORMATION OUTPUT SECTION
26 TRANSMISSION-RECEPTION SECTION
28 RECEPTION SECTION
29 RECORD SECTION
  FIG. 14
A. METHOD OF RECORDING PRINT DOCUMENT INFORMATION
B. TERMINAL 2
C. DOCUMENT MANAGEMENT SERVER 3
D. IDENTIFICATION INFORMATION MANAGEMENT SERVER 4
E. MULTIFUNCTION MACHINE 5
F. START
G. END
S121 INPUT COMMAND
S122 TRANSMIT RECORD COMMAND
S131 RECEIVE COMMAND
S132 SEARCH
S133 TRANSMIT DOCUMENT FILE
S141 RECEIVE DOCUMENT FILE
S142 GENERATE IDENTIFICATION INFORMATION
S143 STORE
S144 OUTPUT ADDITIONAL IMAGE INFORMATION
S145 GENERATE SUPERPOSITION INFORMATION
S146 TRANSMIT CODE PATTERN IMAGE
S151 RECEIVE CODE PATTERN IMAGE
S152 RECORD
  FIG. 15
31 IMAGE INPUT SECTION
32 PATTERN DETECTION SECTION
33 INFORMATION DETECTION SECTION
35 NOISE REMOVAL SECTION
36 DOT PATTERN DETECTION
37 CONTROL CODE PATTERN DETECTION SECTION
39 SYNCHRONIZATION SECTION
40 UNIT-CODE-PATTERN BOUNDARY DETECTION SECTION
41 SYNCHRONOUS CODE DETECTION SECTION
42 IDENTIFICATION CODE DETECTION SECTION
43 RS CODE DECODE SECTION
44 POSITION CODE DETECTION SECTION
45 POSITION CODE DECODE SECTION
47 MULTIFUNCTION MACHINE OPERATION CONTROL SECTION
48 IMAGE READING SECTION
49 IMAGE TRANSMISSION SECTION
50 IMAGE FORMATION SECTION
51 FAX TRANSMISSION SECTION
A. IDENTIFICATION INFORMATION
B. POSITION INFORMATION
  FIG. 16
A. DECODING PROCESS METHOD
B. START
C. END
S161 INPUT IMAGE
S162 REMOVE NOISE

S163 DETECT DOT PATTERN
S164 SYNCHRONIZE
S165 DETECT BOUNDARY BETWEEN UNIT CODE PATTERNS
S166 DETECT SYNCHRONOUS CODE
S167 DETECT IDENTIFICATION CODE
S168 DECODE RS CODE
S169 DETECT POSITION CODE
S170 DECODE POSITION CODE
FIG. 19
A. METHOD OF DETERMINING BOUNDARY BETWEEN UNIT CODE PATTERNS
B. START
C. END
S181 SCAN VIRTUAL LATTICE
S182 COUNT
S183 CALCULATE VARIATIONS
S184 FIX LATTICE PATTERN
S185 DETERMINE BOUNDARY POSITION
S186 DETECT SYNCHRONOUS CODE
S187 DETERMINE ROTATION
S188 EXTRACT POSITION CODE AND IDENTIFICATION CODE
FIG. 21
A. OPERATION CONTROL METHOD
B. START
C. END
S201 INPUT IMAGE
S202 REMOVE NOISE
S203 DETECT CONTROL CODE AREA
S204 DETECT CONTROL CODE PATTERN
S205 CONTROL OPERATION OF MULTIFUNCTION MACHINE
FIG. 22
11 KEYBOARD
12 DISPLAY
13 TRANSMISSION-RECEPTION SECTION
14 CONTROL SECTION
16 DATABASE
17 TRANSMISSION-RECEPTION SECTION
18 CONTROL SECTION
21 CONTROL CODE GENERATION SECTION
22 IDENTIFICATION CODE GENERATION SECTION
23 DATABASE
24 ADDITIONAL IMAGE INFORMATION OUTPUT SECTION
25 SUPERPOSITION INFORMATION OUTPUT SECTION
26 TRANSMISSION-RECEPTION SECTION
27 ALREADY-WRITTEN DOCUMENT INFORMATION GENERATION SECTION
28 RECEPTION SECTION
29 RECORD SECTION
A. WRITING-INFORMATION GENERATION METHOD
S246 GENERATE ALREADY WRITTEN DOCUMENT INFORMATION
B. ELECTRONIC PEN 9
C. TERMINAL 2
D. IDENTIFICATION INFORMATION MANAGEMENT SERVER 4
E. DOCUMENT MANAGEMENT SERVER 3
F. START
G. END
S221 DETECT WRITING OPERATION
S222 ACQUIRE IMAGE INFORMATION
S223 DETECT CODE PATTERN
S224 EXTRACT
S225 GENERATE WRITING INFORMATION
S226 STORE
S227 TRANSMIT WRITING INFORMATION
S231 RECEIVE WRITING INFORMATION
S232 TRANSMIT WRITING INFORMATION
S233 RECEIVE ALREADY WRITTEN DOCUMENT INFORMATION
S234 DISPLAY
S241 RECEIVE WRITING INFORMATION
S242 EXTRACT IDENTIFICATION INFORMATION
S243 SEARCH FOR ATTRIBUTE INFORMATION
S244 SEND DOCUMENT INFORMATION TRANSMISSION REQUEST
S245 RECEIVE DOCUMENT INFORMATION
S246 GENERATE ALREADY WRITTEN DOCUMENT INFORMATION
S247 TRANSMIT ALREADY WRITTEN DOCUMENT INFORMATION
S251 RECEIVE TRANSMISSION REQUEST
S252 TRANSMIT DOCUMENT INFORMATION

What is claimed is:

1. An image generation apparatus comprising:
an additional image information generation section that generates additional image information in which control information, which controls operation of a machine for reading information recorded on a recording medium, is placed as second image information in partitions formed by two-dimensionally placing position information, which are unique to positions on the recording medium or unique to recording positions of a document image recorded on the recording medium as first image information; and
a superposition information generation section that converts acquired document information into third image information and superposes the third image information and the additional image information generated by the additional image information generation section to generate superposition information, wherein
a control code block to embed the information recorded on the recording medium includes a first code block and a second code block, wherein
the first code block includes a synchronous code,
the second code block is placed on an area of the code block other than the area where the first code block is placed,
the synchronous code indicates rotation angles of code blocks, and
the second code block includes the superposed information superposed by the superposition information generation section.

2. The apparatus according to claim 1, wherein the position information is generated in the image generation apparatus or is input from an external unit.

3. The apparatus according to claim 1, wherein the control information is generated in the image generation apparatus or is input from an external unit.

4. The apparatus according to claim 1, wherein the document information is previously stored in the image generation apparatus or is input from an external unit.

5. The apparatus according to claim 1, further comprising:
a recording section that records the superposition information on the recording medium, wherein:

the recording section forms the second image information of the control information and the first image information of the position information with different color materials.

6. The apparatus according to claim 5, wherein an infrared absorption amount of the color material used for the second image information of the control information is a half or less of an infrared absorption amount of the color material used for the first image information of the position information.

7. The apparatus according to claim 1, wherein the additional image information generation section generates the additional image information in which identification information that identifies the recording medium or the document information recorded on the recording medium is placed as fourth image information in the partitions formed by two-dimensionally placing the position information as the first image information, together with the control information.

8. The apparatus according to claim 7, wherein the identification information is generated in the image generation apparatus or is input from an external unit.

9. The apparatus according to claim 8, wherein the additional image information generation section places the control information and the identification information alternately in the partitions formed by two-dimensionally placing the position information as the first image information.

10. A non-transitory computer readable medium storing a program causing a computer to execute a process for information generation, the process comprising:
generating additional image information in which control information, which controls operation of a machine for reading information recorded on a recording medium, is placed as second image information in partitions formed by two-dimensionally placing position information, which are unique to positions on the recording medium or unique to recording positions of a document image recorded on the recording medium as first image information;
converting acquired document information in third image information; and
superposing the third image information and the generated additional image information to generate superposition information, wherein
a control code block to embed the information recorded on the recording medium includes a first code block and a second code block, wherein
the first code block includes a synchronous code,
the second code block is placed on an area of the code block other than the area where the first code block is placed,
the synchronous code indicates rotation angles of code blocks, and
the second code block includes the superposed information superposed by the superposition information generation section.

11. An image generation method comprising:
generating additional image information in which control information, which controls operation of a machine for reading information recorded on a recording medium, is placed as second image information in partitions formed by two-dimensionally placing position information, which are unique to positions on the recording medium or unique to recording positions of a document image recorded on the recording medium as first image information;
converting acquired document information into third image information; and
superposing the third image information and the generated additional image information to generate superposition information, wherein
a control code block to embed the information recorded on the recording medium includes a first code block and a second code block, wherein
the first code block includes a synchronous code,
the second code block is placed on an area of the code block other than the area where the first code block is placed,
the synchronous code indicates rotation angles of code blocks, and
the second code block includes the superposed information superposed by the superposition information generation section.

12. The apparatus according to claim 1, wherein the control information includes copy prohibition information, scan prohibition information and FAX prohibition information.

* * * * *